(12) United States Patent
Chin et al.

(10) Patent No.: US 11,342,980 B2
(45) Date of Patent: May 24, 2022

(54) METHODS AND APPARATUSES FOR UPLINK TRANSMISSION PRIORITIZATION

(71) Applicant: FG Innovation Company Limited, Tuen Mun (HK)

(72) Inventors: Heng-Li Chin, Taipei (TW); Hsin-Hsi Tsai, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 125 days.

(21) Appl. No.: 16/992,501

(22) Filed: Aug. 13, 2020

(65) Prior Publication Data
US 2021/0050901 A1 Feb. 18, 2021

Related U.S. Application Data

(60) Provisional application No. 62/886,776, filed on Aug. 14, 2019.

(51) Int. Cl.
*H04B 7/06* (2006.01)
*H04W 72/10* (2009.01)
(Continued)

(52) U.S. Cl.
CPC ......... *H04B 7/0695* (2013.01); *H04L 1/1614* (2013.01); *H04W 72/042* (2013.01);
(Continued)

(58) Field of Classification Search
CPC ..... H04B 7/0695; H04B 7/063; H04L 1/1614; H04W 72/042; H04W 72/046;
(Continued)

(56) References Cited

U.S. PATENT DOCUMENTS 11,239,897 B2 * 2/2022 Tsai ..................... H04W 72/14
2018/0323856 A1 11/2018 Xiong et al.
(Continued)

FOREIGN PATENT DOCUMENTS

| CN | 109076616 A | 12/2018 |
| CN | 109842894 A | 6/2019 |
| CN | 109963337 A | 7/2019 |

OTHER PUBLICATIONS

Huawei et al. Discussion on beam failure recovery for SCell 3GPP TSG-RAN WG2 Meeting 102 R2-1807975, May 25, 2018(May 25, 2018) the whole document.

*Primary Examiner* — Afshawn M Towfighi
(74) *Attorney, Agent, or Firm* — ScienBiziP, P.C.

(57) ABSTRACT

A method performed by a UE for Uplink (UL) transmission prioritization is provided. The method includes receiving an RRC message; detecting a beam failure event on an SpCell; and performing operations in response to detecting the beam failure event. The operations include transmitting a preamble to the SpCell; receiving an RAR message from the SpCell; determining whether a first UL resource is enabled for transmission of a BFR report according to whether the first UL resource is indicated by the RAR message and whether the RRC message is configured with an indication; and transmitting the BFR report on the first UL resource after determining that the first UL resource is enabled for the transmission of the BFR report. A UE using the method is also provided.

20 Claims, 9 Drawing Sheets

(51) Int. Cl.
  *H04W 74/08* (2009.01)
  *H04W 80/02* (2009.01)
  *H04W 72/14* (2009.01)
  *H04W 72/04* (2009.01)
  *H04L 1/16* (2006.01)

(52) U.S. Cl.
  CPC ......... *H04W 72/046* (2013.01); *H04W 72/10* (2013.01); *H04W 72/14* (2013.01); *H04W 74/0833* (2013.01); *H04W 80/02* (2013.01)

(58) Field of Classification Search
  CPC . H04W 72/10; H04W 72/14; H04W 74/0833; H04W 80/02
  See application file for complete search history.

(56) References Cited

U.S. PATENT DOCUMENTS

2019/0215888 A1    7/2019  Cirik et al.
2019/0394082 A1*  12/2019  Cirik ..................... H04L 5/0048
2020/0314919 A1*  10/2020  Zhang ................. H04B 7/0695

* cited by examiner

METHODS AND APPARATUSES FOR UPLINK TRANSMISSION PRIORITIZATION

CROSS-REFERENCE TO RELATED APPLICATION(S)

The present disclosure claims the benefit of and priority to provisional U.S. Patent Application Ser. No. 62/886,776 ("the '776 provisional"), filed on Aug. 14, 2019, entitled "Method and apparatus for uplink transmission prioritization." The contents of the '776 provisional are fully incorporated herein by reference for all purposes.

FIELD

The present disclosure generally relates to wireless communications, and more particularly, to methods and apparatuses for uplink (UL) transmission prioritization.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to methods and apparatuses for UL transmission prioritization.

According to a first aspect of the present disclosure, a method for UL transmission prioritization is provided. The method is performed by a User Equipment (UE). The method includes the UE receiving a Radio Resource Control (RRC) message, detecting a beam failure event on a Special Cell (SpCell), and performing operations in response to detecting the beam failure event. The operations include the UE transmitting a preamble to the SpCell, receiving a Random Access (RA) Response (RAR) message from the SpCell, determining whether a first UL resource is enabled for transmission of a Beam Failure Recovery (BFR) report according to whether the first UL resource is indicated by the RAR message and whether the RRC message is configured with an indication, and transmitting the BFR report on the first UL resource after determining that the first UL resource is enabled for the transmission of the BFR report.

In some implementations of the first aspect of the present disclosure, the method further includes determining that the first UL resource is enabled for the transmission of the BFR report when the first UL resource is indicated by the RAR message and the RRC message is configured with the indication.

In some implementations of the first aspect of the present disclosure, the method further includes disabling the UE from transmitting the BFR report on the first UL resource after determining that the first UL resource is not enabled for the transmission of the BFR report.

In some implementations of the first aspect of the present disclosure, the method further includes starting a timer after the preamble is transmitted; receiving an UL grant that indicates a second UL resource when the timer is not running; determining that the second UL resource is not enabled for the transmission of the BFR report; and disabling the UE from transmitting the BFR report on the second UL resource after determining that the second UL resource is not enabled for the transmission of the BFR report.

In some implementations of the first aspect of the present disclosure, the method further includes receiving an UL grant that indicates a second UL resource scheduled on a Secondary Cell (SCell); determining that the second UL resource is not enabled for the transmission of the BFR report; and disabling the UE from transmitting the BFR report on the second UL resource after determining that the second UL resource is not enabled for the transmission of the BFR report.

In some implementations of the first aspect of the present disclosure, the method further includes receiving an UL grant in Downlink Control Information (DCI) that indicates a second UL resource; determining that the second UL resource is not enabled for the transmission of the BFR report; and disabling the UE from transmitting the BFR report on the second UL resource after determining that the second UL resource is not enabled for the transmission of the BFR report.

In some implementations of the first aspect of the present disclosure, the BFR report includes a bitmap that contains a first bit and at least one second bit, the first bit indicates whether the beam failure event is detected on the SpCell, and each of the at least one second bit indicates whether the beam failure event is detected on a corresponding SCell.

In some implementations of the first aspect of the present disclosure, the method further includes setting the first bit and one of the at least one second bit to a same value when the beam failure event is detected on the SpCell and an SCell corresponding to the one of the at least one second bit.

In some implementations of the first aspect of the present disclosure, the indication is contained in a beam failure recovery configuration Information Element (IE) in the RRC message in a case that the RRC message is configured with the indication.

In some implementations of the first aspect of the present disclosure, the method further includes determining that the first UL resource is not enabled for the transmission of the BFR report in a case that the first UL resource is not indicated by the RAR message or the RRC message is not configured with the indication.

According to a second aspect of the present disclosure, a UE is provided. The UE includes a memory and at least one processor coupled to the memory. The at least one processor is configured to receive an RRC message, detect a beam failure event on a SpCell and perform operations in response to detecting the beam failure event. The operations include the UE transmitting a preamble to the SpCell, receiving an RAR message from the SpCell, determining whether a first UL resource is enabled for a transmission of a BFR report according to whether the first UL resource is indicated by the RAR message and whether the RRC message is configured with an indication, and transmitting the BFR report on the first UL resource after determining that the first UL resource is enabled for the transmission of the BFR report.

In some implementations of the second aspect of the present disclosure, the at least one processor is further configured to determine that the first UL resource is enabled for the transmission of the BFR report in a case that the first UL resource is indicated by the RAR message and the RRC message is configured with the indication.

In some implementations of the second aspect of the present disclosure, the at least one processor is further configured to disable the UE from transmitting the BFR report on the first UL resource after determining that the first UL resource is not enabled for the transmission of the BFR report.

In some implementations of the second aspect of the present disclosure, the at least one processor is further configured to start a timer after the preamble is transmitted; receive an UL grant that indicates a second UL resource when the timer is not running; determine that the second UL resource is not enabled for the transmission of the BFR report; and disable the UE from transmitting the BFR report on the second UL resource after determining that the second UL resource is not enabled for the transmission of the BFR report.

In some implementations of the second aspect of the present disclosure, the at least one processor is further configured to receive an UL grant that indicates a second UL resource scheduled on an SCell; determine that the second UL resource is not enabled for the transmission of the BFR report; and disable the UE from transmitting the BFR report on the second UL resource after determining that the second UL resource is not enabled for the transmission of the BFR report.

In some implementations of the second aspect of the present disclosure, the at least one processor is further configured to receive an UL grant in DCI that indicates a second UL resource; determine that the second UL resource is not enabled for the transmission of the BFR report; and disable the UE from transmitting the BFR report on the second UL resource after determining that the second UL resource is not enabled for the transmission of the BFR report.

In some implementations of the second aspect of the present disclosure, the BFR report includes a bitmap that contains a first bit and at least one second bit, the first bit indicates whether the beam failure event is detected on the SpCell, and each of the at least one second bit indicates whether the beam failure event is detected on a corresponding SCell.

In some implementations of the second aspect of the present disclosure, the at least one processor is further configured to set the first bit and one of the at least one second bit to a same value when the beam failure event is detected on the SpCell and an SCell corresponding to the one of the at least one second bit.

In some implementations of the second aspect of the present disclosure, the indication is contained in a beam failure recovery configuration IE in the RRC message in a case that the RRC message is configured with the indication.

In some implementations of the second aspect of the present disclosure, the at least one processor is further configured to determine that the first UL resource is not enabled for the transmission of the BFR report in a case that the first UL resource is not indicated by the RAR message or the RRC message is not configured with the indication.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
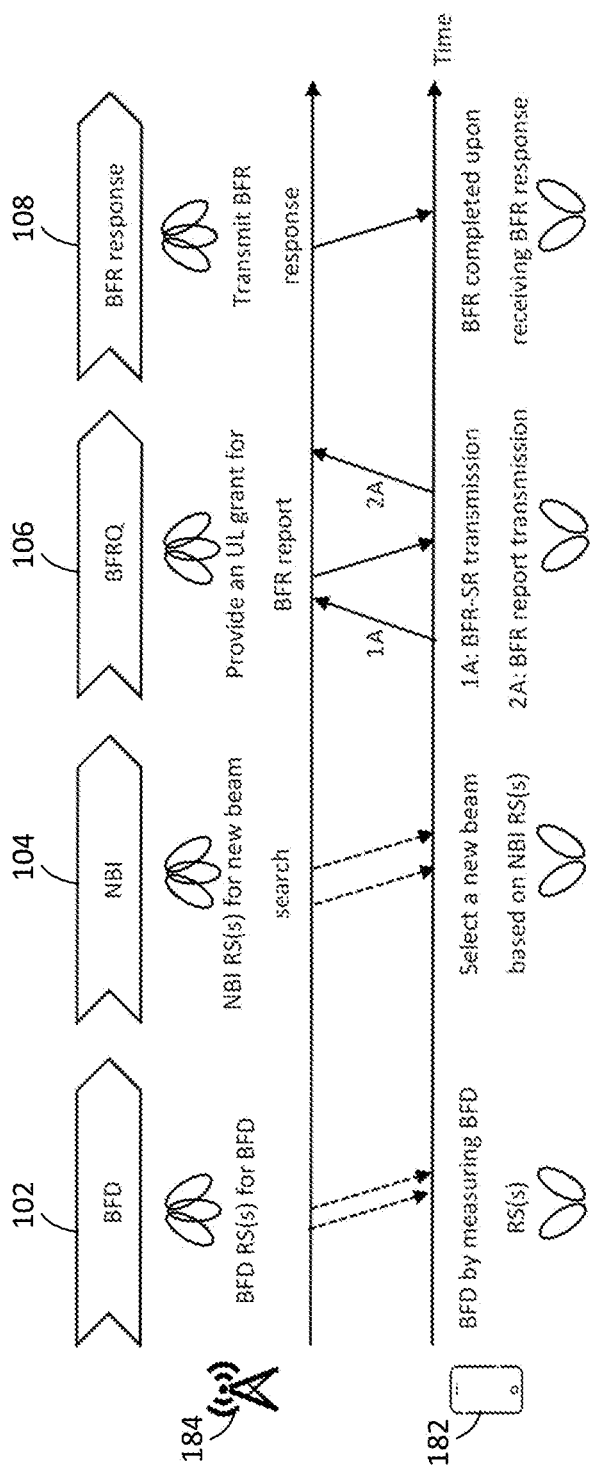
FIG. 1 illustrates a Beam Failure Detection (BFD) procedure and BFR procedure of a cell, in accordance with an implementation of the present disclosure.

The following description contains specific information pertaining to example implementations in the present disclosure. The drawings in the present disclosure and their accompanying detailed description are directed to merely exemplary implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure so described may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the so-described combination, group, series, and the equivalent.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. Besides, the character "/" used herein generally represents that the former and latter associated objects are in an "or" relationship.

Additionally, for non-limiting explanations, specific details, such as functional entities, techniques, protocols, standards, and the like, are set forth for providing an understanding of the described technology. In other examples, a detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software, or a combination of software and hardware. Described functions may correspond to modules that may be software, hardware, firmware, or any combination thereof. The software implementation may comprise computer-executable instructions stored on computer-readable media such as memory or other types of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer-readable media include but are not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) typically includes at least one Base Station (BS), at least one UE, and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

It should be noted that, in the present disclosure, a UE may include, but is not limited to, a mobile station, a mobile terminal or device, a user communication radio terminal. For example, a UE may be portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM EDGE Radio Access Network (GERAN), an ng-eNB as in an E-UTRA BS in connection with the 5GC, a next-generation node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells being included in the RAN. The BS may support the operations of the cells. Each cell is operable to provide services to at least one UE within its radio coverage. More specifically, each cell (often referred to as a serving cell) may provide services to serve one or more UEs within its radio coverage, (e.g., each cell schedules the downlink (DL) and optionally UL resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells. In Multi-RAT Dual Connectivity (MR-DC) cases, the primary cell of a Master Cell Group (MCG) or a Secondary Cell Group (SCG) may be called as a SpCell. A Primary Cell (PCell) may refer to the SpCell of an MCG. A Primary Secondary (PSCell) may refer to the SpCell of an SCG. MCG means a group of serving cells associated with the Master Node (MN), comprising of the SpCell and optionally one or more secondary cells (SCells). SCG means a group of serving cells associated with the Secondary Node (SN), comprising of the SpCell and optionally one or more SCells.

As discussed above, the frame structure for NR is to support flexible configurations for accommodating various next generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3$^{rd}$ Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

Intra-UE prioritization/multiplexing is one of the areas of focus for the Industrial Internet of Things (IoT). It considers the cases where a UE confronts with DL/UL radio resource conflict between control/data traffics associating to different Quality of Service (QoS) requirements. For example, an Unmanned Aerial Vehicle (UAV) at a smart factory may have to concurrently cope with eMBB traffics such as surveillance video and URLLC traffics such as motion control. Some solutions may be needed to prioritize the radio resource(s) for control/data traffic, which has a higher QoS requirement when a radio resource conflict between the control/data traffics occurs.

In NR, a UE may trigger a BFR procedure (of a cell), during which the UE may inform the serving gNB of a new Synchronization Signal Block (SSB) or a Channel State Information (CSI) Reference Signal (RS) (CSI-RS) when a beam failure event is detected on the serving SSB(s)/CSI-RS(s) (of the cell). For a BFD procedure, the gNB may configure the UE with BFD RS(s) (e.g., SSB(s) or CSI-RS(s)), and the UE may detect a beam failure event when the number of beam failure instance indications from the Physical (PHY) layer reaches a configured threshold before a configured timer expires. An SSB-based BFD procedure may be performed based on the SSB associated with an initial DL Bandwidth Part (BWP), and may only be configured for the initial DL BWP and the DL BWP(s) containing the SSB associated with the initial DL BWP. For other DL BWPs, the BFD procedure may only be performed based on CSI-RS(s).

In one implementation, when a beam failure event is detected, a UE may perform a (Random Access Channel (RACH)-based) BFR procedure including:
triggering the BFR procedure by initiating a RA procedure on a PCell; and
selecting a suitable beam to perform the BFR procedure (e.g., if the gNB has provided the UE with dedicated RA resources for certain beams, those beams may be prioritized to be selected by the UE).

Upon completion of the RA procedure, the BFR procedure may be considered complete.

In the 3GPP Release 15 (Rel-15), the RACH-based BFR mechanism may only be applied for a SpCell (e.g., a PCell or a PSCell), e.g., when a beam failure event is detected on an SpCell. In this case, if beam blockage happens on an SCell and/or a beam failure event is detected on an SCell, a UE may rely on the network to handle it.

For example, a UE may determine that a beam failure event is detected on an SCell based on the absence of Acknowledgement (ACK)/Negative Acknowledgement (NACK) feedback for the scheduled DL transmission in the SCell, or based on the Channel Quality Indicator (CQI) report for the SCell. If beam failure occurs (e.g., a beam failure event has been detected), the network may release this SCell and re-schedule the data transmission. However, this method may decrease the scheduling efficiency and increase the signaling propagation latency of the higher layer(s) (e.g., the Radio Resource Control (RRC) layer). To quickly recover a beam from the beam failure on an SCell, the signaling configuration and/or the BFR procedure may be provided to support an SCell BFR procedure.

In one implementation, the BFD procedure and BFR procedure for an SCell may be illustrated in FIG. 1.

FIG. 1 illustrates a BFD procedure and BFR procedure of a cell, in accordance with an implementation of the present disclosure. The BFD procedure may include action 102. The BFR procedure may include actions 104, 106, and 108. It should be understood that one or more of actions 104, 106, and 108 may be omitted from the BFR procedure.

In action 102, a BFD procedure may be performed. During the BFD procedure, a BFD RS (e.g., an SSB and/or a CSI-RS) may be explicitly or implicitly configured by the BS 184 for the UE 182 to detect a beam failure event. For example, the PHY layer of the UE 182 may measure the radio link quality according to the BFD RS, and provide a beam failure instance indication to the higher layer (e.g., the MAC entity of the UE 182) when the radio link quality is lower than a threshold within a predetermined period of time.

From the perspective of the MAC entity of the UE 182, a beam failure event may be detected if the number of (consecutive) detected beam failure instance indications exceeds a configured maximum number (e.g., a parameter denoted as beamFailureInstanceMaxCount). One beamFailureInstanceMaxCount may be configured for each BWP/cell/subset of a cell group/cell group. On the other hand, a counter (e.g., a parameter denoted as BFI COUNTER) may be used for counting the number of beam failure instance indications. The BFI COUNTER may be used for each BWP/cell/subset of a cell group/cell group. A BFD timer (e.g., a parameter denoted as beamFailureDetectionTimer) may reset the BFI COUNTER upon expiration. The beamFailureDetectionTimer may be configured for each BWP/cell/subset of a cell group/cell group. When a beam failure event is detected, the UE 182 may trigger a BFR procedure. Moreover, if a BFR procedure has been triggered, the UE may trigger a BFR-Scheduling Request (SR) procedure, where the BFR-SR procedure may be an SR procedure triggered for BFR. In one implementation, if a BFR procedure has been triggered, the UE may determine whether there is an available UL resource for the transmission of a BFR report. If there no available UL resource for the transmission of a BFR report, the UE may trigger a BFR-SR procedure. When a BFR-SR procedure has been triggered, the UE may transmit a BFR-SR.

The BFD RSs may be a set of RSs (e.g., SSB and/or CSI-RS). Different sets of the BFD RSs may be associated with different Component Carriers (CCs), cells, sets/groups of cells, Transmission, and Reception Points (TRPs). For example, a first set of the BFD RSs is associated with a first CC/cell. If the UE detects that the quality of the first set of the BFD RSs that the UE uses to assess the radio link quality are all lower than a threshold with a periodicity determined by the maximum between the shortest periodicity among the periodic CSI-RS configurations, and/or SSBs on the PCell or the PSCell, in the first set, a PHY layer of the UE may send a beam failure instance indication to a MAC entity of the UE for the first CC/cell. Subsequently, based on the BFD procedure, the MAC entity may increment the BFI COUNTER of the first CC/cell by '1' for each received beam failure instance indication for the first CC/cell. The beam failure event is considered as being detected for the first CC/cell if the number of beam failure instance indications has reached a configured maximum number for the first CC/cell. On the other hand, if no BFD RSs are provided for a CC (or a cell) for beam failure event detection, the UE may perform beam monitoring based on the activated Transmission Configuration Indication (TCI) state for PDCCH of the CC (or cell). The BFD RS may be transmitted in (active BWP of) either current CC or another CC (e.g., within the same band). The BFD RS may be configured together with the BFR-SR (e.g., in the same configuration).

In one implementation, the UE may detect a poor DL beam quality of a cell based on the measurement (e.g., assessing the radio link quality) of the BFD RS for the cell. Subsequently, the PHY layer of the UE may send a beam failure instance indication of the cell to the MAC entity of the UE, and thus a value of "BFI COUNTER" for the cell may be incremented by '1'. When the "BFI COUNTER" for the cell of the MAC entity reaches a configured maximum number (e.g., a value of "beamFailureInstanceMaxCount"), the UE may consider that a beam failure event is detected on the cell.

In one implementation, when a beam failure event is detected on a cell, the UE may trigger a BFR procedure for the cell. In one implementation, if a BFR procedure has been triggered for a cell, the UE may further determine whether there is available UL resource for the transmission of a BFR report. In one case, if a BFR procedure has been triggered for a cell and there no available UL resource for the transmission of a BFR report, the UE may trigger a BFR-SR procedure (for the cell(s) that has triggered a BFR procedure). In one implementation, when a BFR-SR procedure has been triggered, the UE may transmit BFR-SR. In one implementation, a BFR-SR procedure may be canceled when an UL resource becomes available for the transmission of a BFR report. In one implementation, a BFR-SR procedure of a cell may be canceled when a UE transmits a BFR report, which includes the information of the serving cell where a beam failure event is detected. In one implementation, a BFR-SR procedure of a cell may be canceled when a UE transmits a BFR report, which includes the information of the serving cell that has triggered a BFR procedure.

In one implementation, if a BFR procedure has been triggered (for a cell), action 104, 106, and 108 may be performed (for the corresponding cell).

In action 104, a New Beam Identification (NBI) operation may be performed. During the NBI operation, the UE 182 may search for and select a new beam (or "candidate beam") based on measuring NBI RS(s). For example, the UE 182 may select a beam of which the Layer 1 (L1)-Reference Signal Received Power (RSRP) measurement result is higher than a threshold as a candidate beam. The new beam may be indicated via an RS (e.g., SSB, CSI-RS, and/or Sounding Reference Signal (SRS), and/or TCI state.

The NBI RSs may be a set of RSs (e.g., SSB and/or CSI-RS) that is used for new beam identification. Different sets of the NBI RSs may be configured for different CCs (or cells), sets/groups of cells, TRPs, and/or BWPs. For example, a first set of the NBI RSs is configured for a first CC (or cell). If the beam failure event is detected on the first CC (or cell), the UE may select a new beam according to the measured first set of the NBI RSs. The UE may select a new beam with the highest RSRP in the first set of the NBI RS. Alternatively, the UE may select any new beam in the first set of the NBI RS that is above a configured threshold. The UE may include the information of the NBI RS (e.g., the selected new beam) in the BFR report. The NBI RS may be transmitted in (active BWP of) the CC that is configured to be monitored for BFR or another CC within the same band.

In action 106, a Beam Failure Recovery reQuest (BFRQ) operation may be performed, where the BFRQ operation may include sub-action 1A and sub-action 2A.

In sub-action 1A, the UE 182 may transmit a BFR-SR over a PCell, a PSCell, and/or an SCell, where the BFR-SR may be an SR used to inform the BS 184 of a beam failure event detected on a CC (or Cell) and/or to request for an UL resource. In one implementation, the BFR-SR (in sub-action 1A) may be transmitted by the UE 182 only if a BFR-SR procedure (of a cell) has been triggered and not canceled.

In sub-action 2A, the UE 182 may transmit a BFR report (e.g., via a MAC Control Element (CE)) to the BS 184. The BFR report may include the failed CC(s)/Cell(s) information (e.g., Cell index), new beam(s) information (e.g., the new beam may be selected based on measuring NBI RS), and/or no-new-beam information. For example, the no-new-beam information may indicate that the UE 182 does not find any (qualified) new beam/candidate beam (e.g., the UE 182 does not find any new beam/candidate beam with the corresponding L1-RSRP higher than a threshold). In one implementation, the BFR report (in sub-action 1A) may be transmitted by the UE 182 if a BFR procedure (of a cell) has been triggered and not canceled.

In one implementation, the BFR report may be transmitted via an UL grant that is requested by the BFR-SR.

In one implementation, the BFR report may be transmitted via arbitrary UL grant(s) (e.g., an UL grant provided in an RAR, a dynamic UL grant provided via a Physical Downlink Control Channel (PDCCH), and/or a configured grant).

In action 108, a BFR response operation may be performed. During the BFR response operation, the UE may attempt to monitor a BFR response (e.g., via PDCCH monitoring) from the BS 184 after transmitting a BFRQ (e.g., a BFR-SR and/or a BFR report).

In one implementation, the BFR response may be transmitted on a PCell, a PSCell, and/or an SCell.

Upon receiving the BFR response, the UE 182 may consider that the BFR procedure is completed. In one implementation, the UE 182 may cancel the triggered BFR procedure when the BFR procedure is completed. In one implementation, the UE 182 may cancel the triggered BFR procedure of a cell when the BFR procedure is completed at the cell. In one implementation, the UE 182 may cancel the triggered BFR procedure of a cell upon reception of a BFR response from BS 184 as a response of a BFR report transmitted by UE 182, and the BFR report includes BFR information of the cell. In one implementation, the UE 182 may cancel the triggered BFR procedure of a cell upon transmission of a BFR report that includes BFR information of the cell.

In NR or LTE, an (regular) SR may be used for requesting an UL-SCH resource for a new transmission. The UE may be configured with zero, one, or more SR configurations. An SR configuration may include a set of Physical Uplink Control Channel (PUCCH) resources for SR across different BWPs and cells. For a Logical Channel (LCH), at most one PUCCH resource for SR may be configured per BWP. Each SR configuration may correspond to one or more LCHs. Each LCH may be mapped to zero or one SR configuration. The SR configuration of the LCH that triggered the Buffer Status Report (BSR) (if such a configuration exists) is considered as corresponding SR configuration for the triggered SR. When an SR (procedure) is triggered, it shall be considered as pending until it is canceled.

Compared to the (regular) SR described above, a BFR-SR may be used in a BFRQ operation (e.g., sub-action 1A illustrated in FIG. 1). For example, the BFR-SR may be transmitted on a dedicated SR-like PUCCH resource for BFR when a BFR-SR procedure has been triggered and not canceled. The BFR-SR may be used to inform a BFRQ and/or used for requesting an UL-SCH resource for BFR report transmission. The UL resource required by a BFR-SR may (only) be used for BFR (report transmission). The UE may be configured with zero, one, or more BFR-SR configuration. Besides, the PUCCH resource for BFR-SR transmission may be configured per BWP, per TRP, per CC, per set of CCs, per Cell Group (CG), and/or per UE. The BFR-SR may be transmitted on a PCell, a PSCell, and/or an SCell. In one implementation, the BFR-SR may be transmitted through a cross-cell transmission (e.g., a beam failure event happens on an SCell, and the BFR-SR for the beam failure event is transmitted on a PCell). In one implementation, the BFR-SR configuration may be a configuration which is not one of the SR configurations (e.g., the identification (ID) of BFR-SR configuration may not share with the parameter/Information Element (IE) denoted as schedulingRequestid (e.g., specified in the 3GPP Technical Specification (TS) 38.331, version 15.5.0)). In one implementation, the BFR-SR configuration may be one of the SR configurations (e.g., the ID of BFR-SR configuration may share with the schedulingRequestid.)

The BFR report transmission may also be included in a BFRQ operation (e.g., sub-action 2A illustrated in FIG. 1). In one implementation, a BFR report may (only) be transmitted on an UL grant that is requested by a BFR-SR. In one implementation, whether the UL grant is requested by a BFR-SR may be indicated based on an implicit or explicit way. In one implementation, the BFR report may be transmitted by MAC CE(s) and/or UL Control Information (UCI). In one implementation, the BFR report may be transmitted on a PUCCH and/or a PHY UL Shared Channel (PUSCH). The term "BFR MAC CE" may be used to describe a BFR report transmitted via a MAC CE.

In one implementation, a BFR report may include at least one of the following items:
 (failed) CC (or cell) information (e.g., cell index/ID);
 a (failed) set/group(s) of cells (which may be preconfigured by the network);
 (failed) TRP information;
 (failed) BWP information (e.g., BWP ID);
 the corresponding measurement result (e.g., RSRP or Signal to Interference plus Noise Ratio (SINR)) of the (failed) CC, set/group of cells, TRP, and/or BWP;
 candidate beam information (or new beam information) (e.g., one or more qualified beams determined based upon measuring NBI RS(s)); and
 no-new-beam information (e.g., provided if the UE cannot find any new beam with its RSRP higher than a threshold for the (failed) CC, set/group of cells, TRP, and/or BWP).

In one implementation, the BFD RSs may be a set of RSs (e.g., including SSB(s) and/or CSI-RS(s)) used for the detection of a beam failure event. Different sets of BFD RSs may be associated with different CCs (or cells), different sets/groups of cells, different TRPs, and/or different BWPs. For example, if a first set of BFD RSs is associated with a first CC, and the UE detects that the quality of the first set of BFD RSs is lower than a threshold for a period of time, the UE may determine that the first CC is failed (or a beam failure event is detected). On the other hand, if no BFD RS(s) is provided for a CC (or cell) for the BFD procedure, the UE may perform beam monitoring based on an activated TCI-state for a PDCCH of the CC (or cell). A BFD RS may be transmitted in (the active BWP of) the current CC or another CC (e.g., within the same frequency band). In one implementation, the BFD RS may be configured together with a BFR-SR.

In one implementation, the NBI RSs may be a set of RSs (e.g., including SSB(s) and/or CSI-RS(s)) used for NBI. Different sets of NBI RSs may be configured for different CCs (or cells), sets/groups of cells, TRPs, and/or BWPs. For example, if a first set of NBI RSs is configured for a first CC (or cell), and the first CC (or cell) happens beam failure (e.g., a beam failure event is detected for the first CC (or cell)), the UE may select a new/candidate beam based on the measurement results for the first set of NBI RSs. For example, the UE may select a beam having the highest RSRP within the first set of NBI RSs as the new beam for BFR. In one implementation, the UE may include the information of the NBI RS(s) in a BFR report. An NBI RS (e.g., an SSB or a CSI-RS) may be transmitted in (the active BWP of) a CC that is configured to be monitored for BFR or another CC within the same frequency band.

In one implementation, FIG. 1 may also be used to illustrate a BFD procedure and BFR procedure for the PCell (e.g., a RACH-based BFR procedure for the PCell). In action 102, the UE 182 may detect a poor DL beam quality of the PCell based on the measurement (e.g., assessing the radio link quality) of the BFD RS for the PCell. Subsequently, the PHY layer of the UE 182 may send a beam failure instance indication of the cell to the MAC entity of the UE, and thus a value of "BFI COUNTER" for the PCell may be incremented by '1'. When the "BFI COUNTER" for the PCell of the MAC entity reaches a configured maximum number (e.g., a value of "beamFailureInstanceMaxCount"), the UE 182 may consider that a beam failure event is detected on the PCell. In one implementation, when a beam failure event is detected on the PCell, the UE 182 may skip 104 and directly perform action 106. During action 106, BFR-SR transmission in the BFRQ operation (e.g., sub-action 1A illustrated in FIG. 1) of the BFR procedure may be replaced by Physical RACH (PRACH) transmission. For example, in the first step of the BFRQ, the UE 182 may perform a PRACH transmission (e.g., transmits preamble) to request for an UL resource for transmission of the BFR report. After the BS 184 receives the PRACH transmission (e.g., preamble) in sub-action 1A, it may provide an UL grant for the BFR report via an RAR message from the SpCell. As such, the UE 182 may transmit a BFR report in an UL grant provided in an RAR (e.g., in an UL resource indicated by RAR), as illustrated in sub-action 2A. Finally, in action 108, a BFR response operation may be performed after receiving the BFR report in sub-action 2A. During the BFR response operation, the UE 182 may attempt to monitor a BFR response (e.g., via PDCCH monitoring) from the BS 184 after transmitting a BFRQ (e.g., a PRACH transmission and/or a BFR report). Upon receiving the BFR response from BS 184, the UE 182 may consider that the BFR procedure is completed.

Priority of MAC PDU Multiplexing

A UE may multiplex MAC CEs and MAC Service Data Units (SDUs) in a MAC PDU, e.g., based on Multiplexing and Assembly mechanism and/or an LCH Prioritization (LCP) procedure (e.g., specified in the 3GPP TS 38.321, version 15.5.0). A MAC PDU may include one or more MAC subPDUs. Each MAC subPDU may include one of the following:

a MAC subheader only (including padding);
a MAC subheader and a MAC SDU;
a MAC subheader and a MAC CE;
a MAC subheader and padding.

The MAC SDUs are of variable sizes. Each MAC subheader may correspond to a MAC SDU, a MAC CE, or padding.

Figure 2:
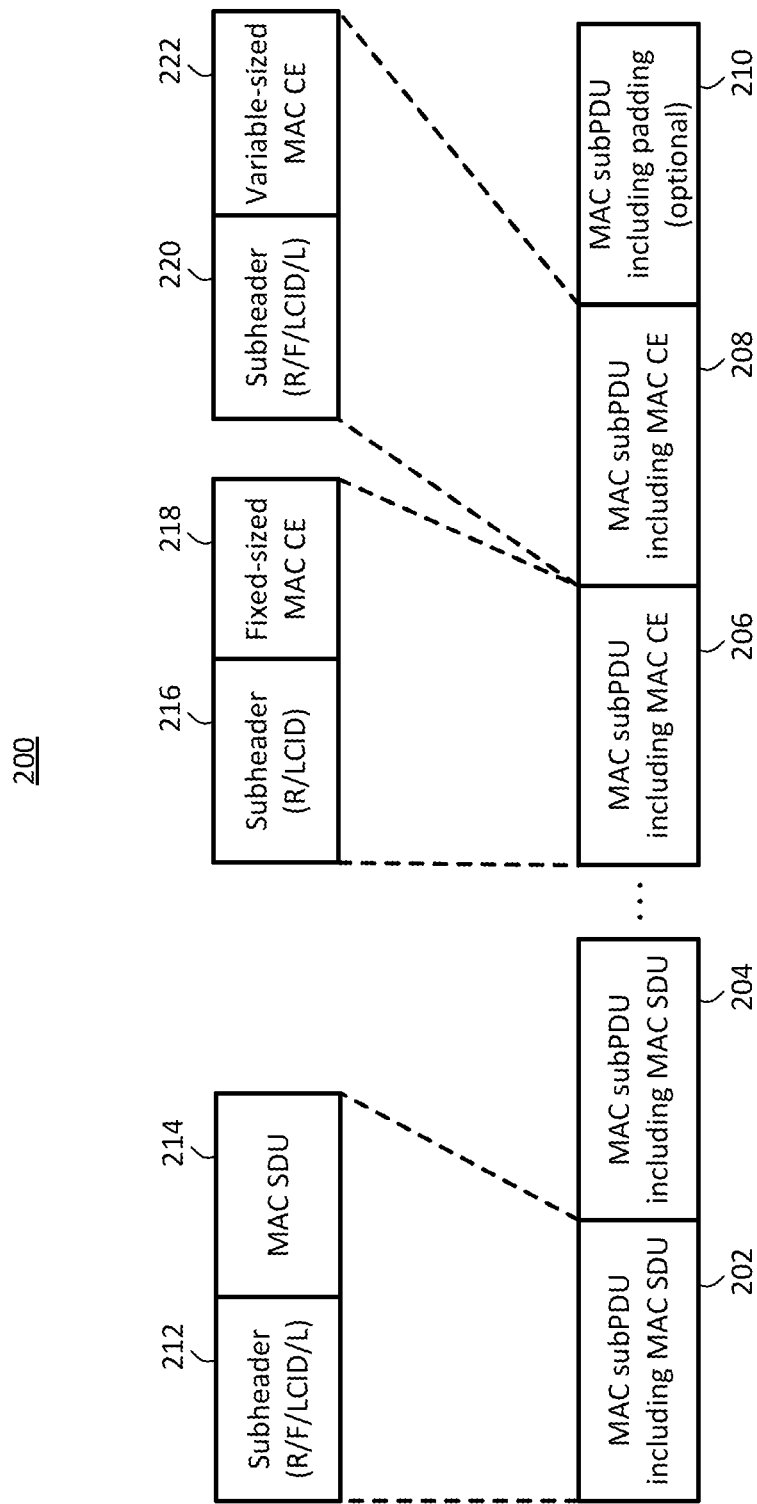
FIG. 2 illustrates the data structure of an UL Medium Access Control (MAC) Protocol Data Unit (PDU) in accordance with an implementation of the present disclosure.

FIG. 2 illustrates the data structure of an UL MAC PDU in accordance with an implementation of the present disclosure. As illustrated in FIG. 2, the UL MAC PDU 200 may include several MAC subPDUs (e.g., MAC subPDU 202, MAC subPDU 204, MAC subPDU 206, MAC subPDU 208, and MAC subPDU 210). One or more of the MAC subPDUs may include MAC SDU(s), such as the MAC subPDU 202 and the MAC subPDU 204. One or more of MAC subPDUs may include MAC CE(s), such as the MAC subPDU 206 that includes the MAC CE 218, and the MAC subPDU 208 that includes the MAC CE 222. One or more of the MAC subPDUs may include padding, such as the MAC subPDU 210. The presence of the MAC subPDU(s) that includes padding may be optional in the UL MAC PDUPDU 200. For example, the UL MAC PDUPDU 200 may not include the MAC subPDU 210 if the size of the padding is zero.

MAC CEs may be placed together. For example, DL MAC subPDU(s) with the MAC CE(s) may be placed before any MAC subPDU with a MAC SDU and a MAC subPDU with padding. On the other hand, UL MAC subPDU(s) with MAC CE(s) (e.g., the MAC subPDUs 206 and 208) may be placed after all the MAC subPDU(s) with MAC SDU (e.g., the MAC subPDUs 202 and 204) and before the MAC subPDU with padding (e.g., the MAC subPDU 210) in the UL MAC PDU.

Besides, a MAC subheader except for fixed-sized MAC CE, padding, and a MAC SDU containing an UL Common Control Channel (CCCH) (UL-CCCH) may include the four header fields, such as the R field, the F field, the LCH ID (LCID) field, and the L field (denoted as "R/F/LCID/L" in FIG. 2). A MAC subheader for fixed-sized MAC CE, padding, and a MAC SDU containing an UL CCCH may include the two header fields, such as the R field and the LCID field (denoted as "R/LCID" in FIG. 2). As illustrated in FIG. 2, the MAC subPDU 202 (with a MAC SDU) may include the subheader 212 and the MAC SDU 214, where the subheader 212 may include four header fields (e.g., R/F/LCID/L). The MAC subPDU 206 may include the subheader 216 and the fixed-sized MAC CE 218, where the subheader 216 may include two header fields (e.g., R/LCID). The MAC subPDU 208 may include the subheader 220 and the variable-sized MAC CE 222, where the subheader 220 may include four header fields (e.g., R/F/LCID/L).

A maximum of one MAC PDU may be transmitted per Transport Block (TB) per MAC entity.

Different MAC CEs for UL may have different priorities to be multiplexed in the MAC PDU. For example, the LCHs may be prioritized by the following order (highest priority listed first):

Cell-Radio Network Temporary Identity (RNTI) (C-RNTI) MAC CE or data from UL-CCCH;
configured grant confirmation MAC CE;
MAC CE for BSR, with exception of a BSR included for padding;
single Entry Power Headroom Report (PHR) MAC CE or Multiple Entry PHR MAC CE;
data from any LCH, except data from UL-CCCH;
MAC CE for Recommended bit rate query;
MAC CE for BSR included for padding.

However, the existing priority order for MAC PDU multiplexing may cause several downsides. For example, an UL resource may not be enough to accommodate data from an LCH because most of the MAC CEs have higher priority order than the data from LCH (particularly LCH except UL-CCCH) when performing MAC PDU multiplexing, resulting in extra delay and service degradation to the traffic supported by these LCHs. Thus, additional rules may be introduced based on the existing priority rule when performing MAC PDU multiplexing. For example, an LCH other than the UL-CCCH, where the LCH is configured to support delay-sensitive data, may have higher priority than one or more existing/new MAC CE(s) (e.g., BSR MAC CE) while performing MAC PDU multiplexing. Several approaches may be provided.

Approach 1: LCP Mapping Restriction for MAC CE

In NR Rel-15, a MAC CE can be transmitted on any UL resource. However, this may not be desirable because some MAC CEs may be triggered/initiated due to procedures that are delay-sensitive. For example, a BFR MAC CE may be transmitted during a BFR procedure (e.g., when a BFR procedure has been triggered), which may directly affect the service continuity experienced by a UE. With approach 1, LCP mapping restriction(s) may be introduced to specific MAC CE(s) to allow these MAC CE(s) (e.g., BFR MAC CE) to only be transmitted on UL resource(s) with specific characteristics, e.g., an UL resource with a short duration in the time domain.

In one implementation, a first indication(s) may be configured for an UL resource to indicate that it may only be used for MAC CE(s) that are configured with a second indication.

In one implementation, a first indication(s) with a certain value may be configured for an UL resource to indicate that it may only be used for MAC CE(s) that are configured with a second indication(s), which has the same value as the first indication(s).

In one implementation, a first indication with a certain status may be configured for an UL resource to indicate that it may only be used for MAC CE(s) that are configured with a second indication, which has the same status as the first indication.

In one implementation, a first indication(s) may be configured for an UL resource to indicate that it may only be used for MAC CE(s) that are not configured with a second indication.

In one implementation, a first indication(s) with a certain value may be configured for an UL resource to indicate that it may only be used for MAC CE(s) that are configured with a second indication(s) which has a different value than the first indication(s).

In one implementation, a first indication with a certain status may be configured for an UL resource to indicate that it may only be used for MAC CE(s) that are configured with a second indication, which has a different status that the first indication.

In one implementation, an UL resource may be used for MAC CE(s) means the UE may allocate the corresponding UL resource for the MAC CE(s) for transmission.

In one implementation, an UL resource may not be used for MAC CE(s) means the UE may not allocate the corresponding UL resource for the MAC CE(s) for transmission.

In one implementation, the first indication may be provided in DL RRC signaling or DL Control Information (DCI) field(s) of an UL grant.

In one implementation, if the first indication is provided in the DCI field of an UL grant, the UL resource(s) configured with the first indication may correspond to the UL resource(s) that are scheduled by this UL grant.

In one implementation, the second indication(s) for the MAC CE(s) may be transmitted via RRC signaling. For example, the indication(s) for the MAC CE(s) may be configured in the ConfiguredGrantConfig IE, the BSR-Config IE, the PHR-Config IE, the LogicalChannelConfig IE, and the beamFailureRecoveryConfig IE, etc. In one implementation, a UE may be configured with an indication in a configuration associated with the MAC CE. For example, the indication may be configured in the BSR-config for a BSR MAC CE. In another example, the indication may be configured in the SCell BFR configuration for a BFR MAC CE.

In one implementation, the first and/or second indicator may be represented with the status of TRUE or FALSE.

In one implementation, the second indication(s) may be configured for a BFR MAC CE (which may be delay-sensitive). The network may configure the first indication to the UL resource(s) that has specific characteristics (e.g., having a relatively short duration in the time domain) to allow the BFR MAC CE to be transmitted only on the UL resource(s). Hence, the delay of a BFR procedure may be shortened.

In one implementation, the second indication with a value of 1 may be configured for a BFR MAC CE (which may be delay-sensitive). The network may configure the first indication with a value of 1 (same as the value of the second indication) to the UL resource(s) which has specific characteristics (e.g., having a relatively short duration in the time domain) to allow the BFR MAC CE to be transmitted only on the UL resource(s). Hence, the delay of a BFR procedure may be shortened.

In one implementation, the second indication with a status of TRUE may be configured for a BFR MAC CE (which may be delay-sensitive). The network may configure the first indication with a status of TRUE (same as the value of the second indication) to the UL resource(s) which has specific characteristics (e.g., having a relatively short duration in the time domain) to allow the BFR MAC CE to be transmitted only on theses UL resource(s). Hence, the delay of a BFR procedure may be shortened.

In one implementation, either the first indication or the second indication may be configured per UE, per MAC entity, per LCH, per CC, per BWP, or per beam, such that a UE may apply the LCP rules according to the corresponding configuration to the received UL resources.

In one implementation, one or more indication(s)/parameter(s) may be configured for MAC CE(s) to restrict the transmission of the MAC CE(s), e.g., to restrict the MAC CE(s) using the UL resource. For example, when an UL resource becomes available for a new transmission, the MAC entity may determine whether the MAC CE(s) and/or data from the LCH(s) may be transmitted on the corresponding UL resource based on the indication configured for the MAC CE(s) and/or the LCP mapping restriction(s) configured for each LCH(s) which has data available for transmission.

In one implementation, the MAC CE(s) and/or data from the LCH(s) may be transmitted on the corresponding UL resource if the UE allocates the corresponding UL resource for the MAC CE(s) and/or LCH(s) when an UL transmission is performed.

In one implementation, the MAC CE may be restricted from using the UL resource if the UE is unable to generate the MAC CE for the UL resource (e.g., when performing the LCP procedure to allocate the UL resource).

In one implementation, the MAC CE may be transmitted on the corresponding UL resource if the UE generates the MAC CE for the UL resource (e.g., when performing the LCP procedure to allocate the UL resource).

In one implementation, if the indication is not configured (or is absent) for the MAC CE, the corresponding MAC CE may be transmitted on any UL resource based on an LCP procedure.

In one implementation, the indication may only be configured for MAC CE(s). The MAC CE(s) may be one or more or any combination of a Configured Grant Confirmation MAC CE, a BSR MAC CE, a PHR MAC CE, a MAC CE for Recommended bit rate query, a MAC CE for BSR included for padding, and/or a BFR MAC CE. Hence, the MAC entity may only consider whether (LCP mapping) restriction(s) is configured for the specific MAC CE(s) and/or the LCH(s) when generating a MAC PDU for a new transmission.

In one implementation, this indication may be one or more of the following parameter(s)/IE(s), e.g., allowedSCS-List, maxPUSCH-Duration, configuredGrantType1Allowed, and/or allowedServingCell, as specified in the 3GPP TS 38.331, version 15.5.0.

In one implementation, this indication may be a new mapping restriction, e.g., a mapping restriction(s). When configured for a MAC CE type, the mapping restriction may restrict the MAC CE type to be transmitted on an UL resource with specific characteristic(s). The characteristic(s) may be determined by one or more or any combination of the resource type(s), the BWP index(es), the Modulation Coding Scheme (MCS) table(s), the configured grant periodicity(s), the CG/subset of CG, etc. The resource types may include the dynamic UL grant, the configured grant Type 1/Type 2, the Autonomous UL transmission (AUL), etc.

In one implementation, the network may be restricted to configure allowedServingCells with the index of a PCell and/or the index of a PSCell only for a BFR MAC CE.

In one implementation, the indication(s) for the MAC CE(s) may be transmitted via DL RRC signaling. For example, the indication(s) for the MAC CE(s) may be configured in the ConfiguredGrantConfig IE, the BSR-Config IE, the PHR-Config IE, and the beamFailureRecoveryConfig IE, etc. In one implementation, a UE may be configured with an indication in a configuration associated with the MAC CE. For example, the indication may be configured in BSR-config for BSR MAC CE. In another example, the indication may be configured in the SCell BFR configuration for BFR MAC CE.

In one implementation, the UL resource may be allocated by a dynamic grant, a configured grant Type 1/Type 2, a RAR, or an AUL.

In one implementation, the maxPUSCH-Duration may be configured for a BFR MAC CE (which may be delay-sensitive). As such, the BFR MAC CE may only be transmitted using the UL grants that result in a PUSCH duration shorter than or equal to the duration indicated by the maxPUSCH-Duration. In one implementation, a new mapping restriction may be configured for a BFR MAC CE. Hence, the delay of a BFR procedure may be shortened.

The operation of the MAC entity of a UE may be based on Table 1.

TABLE 1

Example

The MAC entity shall, when a new transmission is performed:
   1>select the LCHs and MAC CEs for each UL grant that satisfies all the following
      conditions:
      2>the set of allowed Subcarrier Spacing (SCS) index values in allowedSCS-List, if
         configured, includes the SCS index associated with the UL grant; and
      2>maxPUSCH-Duration, if configured, is larger than or equal to the PUSCH
         transmission duration associated with the UL grant; and
      2>configuredGrantType1Allowed, if configured, is set to true in case the UL grant is a
         Configured Grant Type 1; and
      2>allowedServingCells, if configured, includes the Cell information associated with the
         UL grant. It does not apply to LCHs associated with a DRB configured with PDCP
         duplication within the same MAC entity (i.e., CA duplication) for which PDCP
         duplication is deactivated.

Approach 2: Grouping of MAC CE

In one implementation, a first indication may be transmitted by the network. Based on the first indication, a UE may determine whether all the MAC CE types may be included in an UL resource, or only specific MAC CE type(s) may be included in the UL resource.

In one implementation, the first indication may be transmitted via RRC signaling. It may be used to indicate whether all the MAC CE types or only the specific MAC CE type(s) may be included in the UL resource(s) of a configured grant Type 1/Type2 or an AUL. The first indication may be, but is not limited to, be configured in the ConfiguredGrantConfig IE or the AUL-Config-r15 IE.

In one implementation, the first indication may be transmitted via RRC signaling. It may be used to indicate whether all the MAC CE types or only specific MAC CE type(s) may be included in UL resource(s) received on a specific BWP/Cell/subset of CG/CG/TCI state. For example, the first indication may be configured in the PUSCH-Config IE or the PUSCH-ConfigCommon IE to indicate only specific MAC CE type(s) may be included in UL resource(s) received on a specific UL BWP.

In one implementation, the first indication may be transmitted via the DCI field of an UL grant. It may be used to indicate whether all the MAC CE types or only specific MAC CE type(s) may be included in UL resource(s) indicated by this UL grant.

In one implementation, the MAC CE type(s) may be, but is not limited to, one or more or any combination of a BFR MAC CE, a Configured Grant Confirmation MAC CE, a MAC CE for BSR except for BSR included for padding, a MAC CE for SL BSR except for SL BSR included for padding, a PHR MAC CE, a MAC CE for Recommended bit rate query, a MAC CE for (SL) BSR included for padding, a MAC CE for SPS/AUL confirmation, etc.

In one implementation, a second indication may be transmitted by the network. Based on the second indication, the UE may determine whether the MAC CE type(s) belongs to the specific MAC CE type(s). For example, when a second indication is configured for a PHR MAC CE, the PHR MAC CE belongs to the specific MAC CE. Conversely, if a second indication is not configured for a PHR MAC CE, the PHR MAC CE does not belong to the specific MAC CE. The second indication may be transmitted via RRC signaling or DCI signaling. In one implementation, whether the specific MAC CE type is included in the UL resource means whether the UE generates the specific MAC CE type for the UL resource (e.g., when performing the LCP procedure to allocate the UL resource).

In one implementation, a first indication may be configured in a ConfiguredGrantConfig IE to indicate that the UL resource(s) scheduled by the corresponding ConfiguredGrantConfig IE may only be used to transmit specific MAC CE(s). Furthermore, a second indication may be configured for specific MAC CE(s) (e.g., BFR MAC CE) to indicate that the MAC CE(s) may be transmitted on the UL resource(s) scheduled by the ConfiguredGrantConfig IE.

In one implementation, a first indication may be configured in certain UL BWP(s), e.g., an UL BWP with a short SCS, to indicate the UL resource(s) on this UL BWP may only be used to transmit specific MAC CE(s). Furthermore, a second indication may be configured for specific MAC CE(s), which may be delay-sensitive (e.g., BFR MAC CE), to indicate that the MAC CE(s) (e.g., BFR MAC CE(s)) can be transmitted on the UL resources(s) on this UL BWP.

In one implementation, the first indication may be configured in the PUSCH-Config IE PUSCH-ConfigCommon IE, which is BWP specific. If the first indication is configured in the PUSCH-Config IE PUSCH-ConfigCommon IE, which is configured in an UL BWP with index j, the UL resource(s) on UL BWP with index j may only be used to transmit specific MAC CE(s), e.g., the MAC CE(s) configured with a second indication.

Approach 3: Prioritize URLLC Data Over MAC CE

In one implementation, a specific MAC CE type(s) may not be included in a MAC PDU when an UL resource arrives if one or more or any combination of the following conditions is satisfied:
   if the corresponding UL resource is for URLLC services with specific characteristics, e.g., associated with a specific RNTI (e.g., MCS C-RNTI), a specific PUSCH duration (or PUSCH duration smaller than a threshold), a specific MCS table (e.g., qam64LowSE or other low Block Error Rate (BLER) MCS table), a specific number of repetitions, indicated by an UL grant with a specific DCI format, periodicity, RAN profile, mini-slot based scheduling, duplication activation/deactivation status, etc.;
   if the corresponding UL resource is (not) indicated to perform non-slot-based repetition;
   if one or more LCH/LCH Group (LCG) is configured specifically for URLLC services;
   if one or more LCH/LCG is configured specifically for certain network slice(s); and
   if one or more LCH/LCG is configured specifically for URLLC services and has available data to be reported on the corresponding UL resource.

The specific MAC CE type(s) may be one or more or any combination of the BFR MAC CE, the Configured Grant Confirmation MAC CE, the MAC CE for BSR except for BSR included for padding, the MAC CE for SL BSR except for SL BSR included for padding, the PHR MAC CE, the MAC CE for Recommended bit rate query, the MAC CE for (SL)BSR included for padding, the MAC CE for SPS/AUL confirmation, etc.

In one implementation, a BSR MAC CE (e.g., MAC CE for BSR except for BSR included for padding, a MAC CE for SL BSR except for SL BSR included for padding, a MAC CE for (SL)BSR included for padding) may not be transmitted on an UL resource if one or more or any combination of the following conditions is satisfied.

if the corresponding UL resource is for URLLC services, which has specific characteristics, e.g., associated with a specific RNTI (e.g., MCS C-RNTI), having a specific PUSCH duration (e.g., a PUSCH duration smaller than a threshold), configure with a specific MCS table (e.g., qam64LowSE or other low BLER MCS table), configure with a specific number of repetitions, indicated by an UL grant with a specific DCI format, periodicity, etc.;

if a BSR MAC CE only needs to report the LCG(s)/LCH(s) that are specifically for non-URLLC services, e.g., no LCH(s)/LCG(s) specifically for URLLC services has data available for transmission when the MAC PDU containing the BSR MAC CE is to be built;

if the buffer size for all the configured LCH(s)/LCG(s) specifically for URLLC services is zero;

if the buffer size for all the configured LCH(s)/LCG(s) specifically for URLLC services is smaller than a threshold;

if one or more LCHs/LCGs are configured specifically for URLLC services; and if one or more LCHs/LCGs are configured specifically for URLLC services and have available data to be reported on the corresponding UL resource.

In one implementation, if an UL resource (e.g., a UL resource #1), is indicated by an UL grant (e.g., a dynamic grant) with a specific DCI format, e.g., a DCI format that is specifically for URLLC services, and also the LCG specifically for URLLC services does not need to be reported in a BSR MAC CE, then this BSR MAC CE may not be transmitted on the UL resource #1.

In one implementation, an LCH specifically for URLLC services may be associated with a specific parameter(s) (e.g., priority, prioritisedBitRate, bucketSizeDuration, etc.) and/or specific mapping restriction(s) (e.g., allowedSCS-List, max-PUSCH-Duration, configuredGrantType1Allowed, allowedServingCells, etc.) and/or specific LCID(s). In one implementation, an LCH specifically for URLLC services may be explicitly indicated by the network via RRC signaling.

In one implementation, an LCG specifically for URLLC service may be an LCG that includes at least one LCH configured for URLLC services. In one implementation, an LCG specifically for URLLC service may have a specific LCG ID.

In one implementation, if an UL resource (e.g., an UL resource #1), is indicated by an UL grant (e.g., dynamic grant) with a specific DCI format, e.g., a DCI format that is specifically for URLLC services, and there is an LCH configured specifically for URLLC services, which has data available to be reported on the UL resource #1, then a PHR MAC CE may not be transmitted on the UL resource #1.

In one implementation, specific MAC CE type(s) may be allocated with UL resource later than LCH(s) specifically for URLLC services if one or more or any combination of the following conditions is satisfied:

if the corresponding UL resource is for URLLC services with specific characteristics, e.g., associated with a specific RNTI (e.g., MCS C-RNTI), having a specific PUSCH duration (e.g., a PUSCH duration smaller than a threshold), configured with a specific MCS table (e.g., qam64LowSE or other low BLER MCS table), configured with a specific number of repetitions, indicated by an UL grant with a specific DCI format, periodicity, etc.;

if one or more LCH/LCG is configured specifically for URLLC services; and if one or more LCH/LCG is configured specifically for URLLC services and has available data to be reported on the corresponding UL resource.

In one implementation, an LCH specifically for URLLC services may be explicitly indicated by the network via RRC signaling.

In one implementation, an LCH specifically for URLLC services may be associated with a specific parameter(s) (e.g., priority, prioritisedBitRate, bucketSizeDuration, etc.) and/or mapping restriction(s) (e.g., allowedSCS-List, maxPUSCH-Duration, configuredGrantType1Allowed, allowedServingCells, etc.) and/or LCID(s).

Approach 4: Prioritization Based on Configured Priority

In one implementation, an indication may be configured for one or more of the existing/new MAC CE type(s). When an UL resource becomes available for a new transmission, the MAC entity may allocate the resource to the MAC CE(s) and the LCH(s) to multiplex a MAC PDU in a specific order, which may be determined by the presence/value of the indication and/or the priority configured for each LCH.

In one implementation, if the indication is not configured for any of the MAC CE type(s), the LCH(s) and MAC CE(s) may be prioritized in the order specified in the TS 38.321 version 15.5.0. On the other hand, if an indication is configured for at least one of the MAC CE type(s), the LCH(s) and MAC CE(s) may be prioritized in a new order that is different from the order specified in the TS 38.321 version 15.5.0.

In one implementation, if every indication configured for the MAC CE type(s) indicates a specific value (e.g., 0), the LCH(s) and MAC CE(s) may be prioritized in the order specified in the TS 38.321 version 15.5.0. Else, if at least one indication configured for a MAC CE types(s) has another specific value (e.g., 1), the LCH(s) and MAC CE(s) may be prioritized in a new order that is different from the order specified in the TS 38.321 version 15.5.0.

In one implementation, the indication configured for the MAC CE(s) may be transmitted via RRC signaling. For example, the indication(s) configured for the MAC CE(s) may be configured in the ConfiguredGrantConfig IE, the BSR-Config IE, the PHR-Config IE, and the beamFailureRecoveryConfig IE, etc. In one implementation, the indication for a MAC CE may be configured in a configuration, which includes the related parameters of this MAC CE. For example, the indication for a BSR MAC CE may be configured in the BSR-config IE. For example, the indication of a PHR MAC CE may be configured in the PHR-Config IE. For example, the indication of a BFR MAC CE may be configured in the beamFailureRecoveryConfig IE. For example, the indication of a Configured Grant Confirmation MAC CE may be configured in the ConfiguredGrantConfig IE.

In one implementation, the presence of the indication (e.g., a 1-bit indication) for a MAC CE type(s) may imply that the corresponding MAC CE type may be allocated with a resource later/earlier than a specific LCH(s). For example, the priority order of LCP for the MAC CE may be lower/higher than the priority order of the specific LCH(s).

In one implementation, the indication (e.g., a 1-bit indication) for a MAC CE type(s) with a specific value (e.g., 1) may imply that the corresponding MAC CE type may be allocated with resource later/earlier than a specific LCH(s).

In one implementation, if the MAC CE is not allocated with a resource, the UE may not generate the MAC CE. Conversely, if the MAC CE is allocated with a resource, the UE may generate the MAC CE.

In one implementation, the indication configured for the MAC CE type(s) may be a priority value. The UE may compare the priority value configured for the MAC CE(s) with the priority value configured for the LCH(s) to determine the order for resource allocation during LCP procedure (e.g., a procedure which multiplexes a MAC PDU for new transmission). The MAC CE/LCH configured with higher/lower priority value may be allocated with a resource earlier. On the other hand, if a MAC CE is configured with equal priority value as an LCH, the MAC CE/LCH may be allocated with the resource first. For example, if an LCH with available data for transmission is configured with a priority value of 1 and a BSR MAC CE to be reported is configured with a priority value of 2, the LCH may be allocated with a resource before the BSR MAC CE when an UL resource for new transmission arrives. Moreover, the size of the resource allocated to the LCH may also follow the Prioritized Bit Rate (PBR) (e.g., prioritisedBitRate), the Bucket Size Duration (BSD) (e.g., bucketSizeDuration), and the variable Bj of this LCH. For example, when a transmission is performed, the UE may allocate the resource in the following sequential order:

- LCH(s) selected (by considering the availability of data and the mapping restriction configured for the LCH) for the UL grant with Bj>0 or MAC CE configured with priority are allocated resources in a decreasing priority order. If the PBR of an LCH is set to infinity, the MAC entity shall allocate resources for all the data that is available for transmission on the LCH before meeting the PBR of the lower priority LCH (s);
- decrement Bj by the total size of MAC SDUs served to LCH j above;
- if any resources remain, all the LCHs selected (by considering the availability of data and the mapping restriction configured for the LCH) are served in a decreasing priority order (regardless of the value of Bj) until either the data for that LCH or the UL grant is exhausted, whichever comes first. LCHs configured with equal priority should be served equally.

In one implementation, the variable Bj may be maintained for each LCH j. The MAC entity may initialize the variable Bj of the LCH j to zero when the LCH is established. Moreover, for each LCH j, the MAC entity may increment the value of Bj by the product of PBR and T before every instance of the LCP procedure, where T is the time elapsed since the variable Bj was last incremented, and PBR may be configured, by the network, for each LCH. Moreover, if the value of Bj is greater than the bucket size (e.g., the product of PBR and BSD), the UE may set the value of Bj to the bucket size.

In one implementation, a specific LCH may correspond to the LCH with a configured priority of higher/lower than a specific value, x. The value x may be preconfigured by the UE or transmitted by the network.

In one implementation, a specific LCH may correspond to the LCH configured with a specific mapping restriction(s), e.g., one or more or any combination of the allowedSCS-List IE, the maxPUSCH-Duration IE, the configuredGrantType1Allowed IE, and the allowedServingCells IE (e.g., as provided in the 3GPP TS 38.331, version 15.5.0).

In one implementation, a specific LCH may correspond to the LCH configured with a specific mapping restriction(s), e.g., a mapping restriction(s), when configured for a MAC CE type, restricts the MAC CE type to an UL resource with specific characteristic(s), For example, the UL resource may be associated with one or more or any combination of the resource type(s), the BWP index(es), the MCS table(s), the configured grant periodicity(s), the CG/subset of CG, etc. The resource types may include the dynamic UL grant, the configured grant Type 1/Type 2, the AUL, etc.

In one implementation, an indication (e.g., a 1-bit indication) may be configured for a PHR MAC CE. The presence of this indication may imply that a PHR MAC CE has lower LCP priority order than specific LCH(s), e.g., the LCH(s) with the configured priority value of smaller than x. In this example, the LCH(s) with a priority value of smaller than x may be configured specifically for URLLC-related services.

In one implementation, an indication (e.g., a 1-bit indication) may be configured for a BFR MAC CE. The presence of this indication may imply that a BFR MAC CE has lower LCP priority order than specific LCH(s), e.g., the LCH(s) with the configured priority value of smaller than x. In this example, the LCH(s) with a priority value of smaller than x may be configured specifically for URLLC-related services.

Approach 5: Priority Order of MAC CE

If a new MAC CE is introduced, e.g., BFR MAC CE, the priority of the BFR MAC CE for multiplexing may be specified, e.g., based on the characteristics of the new MAC CE compared to the other MAC CEs. As described above, a BFR MAC CE may be transmitted when an SCell(s) detects a beam failure event. When a beam failure event is detected for an SCell, the radio channel of the beam failed SCell(s) would be not qualified to be transmitted, which may cause inefficiency of the wireless communication system, e.g., power consumption, resource inefficiency, channel interference, etc. It may be important to recover the misalignment of the beam(s) between UE and network for the SCell(s). Hence, the priority of the BFR MAC CE may be high.

In one implementation, when the UE multiplexes the MAC CEs into the MAC PDU, the BFR MAC CE may be prioritized in accordance with the following order (highest priority listed first):

- C-RNTI MAC CE or data from an UL-CCCH;
- BFR MAC CE;
- Configured Grant Confirmation MAC CE;
- MAC CE for BSR, except for BSR included for padding;
- Single Entry PHR MAC CE or Multiple Entry PHR MAC CE;
- data from any LCH, except data from an UL-CCCH;
- MAC CE for Recommended bit rate query;
- MAC CE for BSR included for padding.

In one implementation, when the UE multiplexes the MAC CEs into the MAC PDU, the BFR MAC CE may be prioritized in accordance with the following order (highest priority listed first):

- C-RNTI MAC CE or data from an UL-CCCH;
- Configured Grant Confirmation MAC CE;
- BFR MAC CE;
- MAC CE for BSR, except for BSR included for padding;
- Single Entry PHR MAC CE or Multiple Entry PHR MAC CE; data from any LCH, except for data from an UL-CCCH;
- MAC CE for Recommended bit rate query;
- MAC CE for BSR included for padding.

In one implementation, when the UE multiplexes the MAC CEs into the MAC PDU, the BFR MAC CE may be prioritized in accordance with the following order (highest priority listed first):
- C-RNTI MAC CE or data from an UL-CCCH;
- Configured Grant Confirmation MAC CE;
- MAC CE for BSR, except for BSR included for padding;
- BFR MAC CE;
- Single Entry PHR MAC CE or Multiple Entry PHR MAC CE;
- data from any LCH, except for data from an UL-CCCH;
- MAC CE for Recommended bit rate query;
- MAC CE for BSR included for padding.

In one implementation, when the UE multiplexes the MAC CEs into the MAC PDU, the BFR MAC CE may be prioritized in accordance with the following order (highest priority listed first):
- C-RNTI MAC CE or data from an UL-CCCH;
- Configured Grant Confirmation MAC CE;
- MAC CE for a BSR, except for BSR included for padding;
- Single Entry PHR MAC CE or Multiple Entry PHR MAC CE;
- BFR MAC CE;
- data from any LCH, except for data from an UL-CCCH;
- MAC CE for Recommended bit rate query;
- MAC CE for BSR included for padding.

In one implementation, different MAC entities might have different priority orders while multiplexing the MAC CE into the MAC PDU, and an entry table would be predefined and configured for the UE.

In one implementation, when the UE multiplexes the MAC CEs into the MAC PDU, the BFR MAC CE may be prioritized with the same order as the Configured Grant Confirmation MAC CE.

An example of the LCP procedure may be based on Table 2.

Approach 6: Location of MAC CE in an UL MAC PDU

In one implementation, once an UL MAC PDU containing (carrying) a BFR MAC CE, part of UL MAC subPDU(s) with MAC CE(s) may be placed before the MAC subPDU(s) with MAC SDU and/or before the MAC subPDU with padding in the MAC PDU. For example, the MAC subPDU(s) with the BFR MAC CE may be placed before the MAC subPDU(s) with the MAC SDU and/or before the MAC subPDU with padding in the MAC PDU.

In one implementation, once an UL MAC PDU containing (carrying) a BFR MAC CE, UL MAC subPDU(s) with a specific type of MAC CE may be placed before the UL MAC subPDU(s) with the remaining type of the MAC CE and/or MAC subPDU(s) with the MAC SDU and/or before the MAC subPDU with padding in the MAC PDU. For example, the MAC subPDU(s) with the BFR MAC CE may be placed before the MAC subPDU(s) with the remaining type of MAC CE and/or the MAC subPDU(s) with the MAC SDU and/or before the MAC subPDU with padding in the MAC PDU.

Overlap of UL Resources

In a single active BWP/serving cell, two or more UL resource (e.g., PRACH/PUCCH/PUSCH resource(s)) transmission occasions may overlap in the time domain. A UE may only select one of the UL resources for transmission at a time, due to limited UE capability. For example, a UE may not transmit the SR on one valid PUCCH resource for SR if the PUCCH resource for the SR transmission occasion overlaps an UL-SCH resource (e.g., dynamic PUSCH resource and/or configured PUSCH resource). In this example, this UE may only perform PUSCH transmission.

There are many cases where overlapping between two or more UL resource transmission occasions may occur. The UE behavior corresponding to each overlapping case may be found in the following implementations.

TABLE 2

| Example |
|---|
| The LCP procedure is applied whenever a new transmission is performed. |
| RRC controls the scheduling of UL data by signaling for each LCH per MAC entity: |
|     priority where an increasing priority value indicates a lower priority level; |
|     prioritisedBitRate that sets the PBR; |
|     bucketSizeDuration that sets the BSD. |
|         RRC additionally controls the LCP procedure by configuring mapping restrictions for each LCH: |
|     allowedSCS-List which sets the allowed SCS(s) for transmission; |
|     maxPUSCH-Duration which sets the maximum PUSCH duration allowed for transmission; |
|     configuredGrantType1Allowed which sets whether a configured grant Type 1 can be used for transmission; |
|     allowedServingCells that sets the allowed cell(s) for transmission. |
| LCHs shall be prioritized in accordance with the following order (highest priority listed first): |
|     C-RNTI MAC CE or data from UL-CCCH; |
|     BFR MAC CE; |
|     Configured Grant Confirmation MAC CE; |
|     MAC CE for BSR, except for BSR included for padding; |
|     Single Entry PHR MAC CE or Multiple Entry PHR MAC CE; |
|     data from any LCH, except for data from UL-CCCH; |
|     MAC CE for Recommended bit rate query; |
|     MAC CE for BSR included for padding. |
| The MAC entity of the UE may: |
|   1> if the BFR procedure (for an SCell(s)) determines that at least one BFR has been triggered and not canceled: |
|     2> if UL-SCH resources are available for a new transmission and the UL-SCH resources can accommodate the BFR MAC CE plus its subheader as a result of LCP |
|       3> instruct the Multiplexing and Assembly procedure to generate the BFR MAC CE. |

Case 1: Two or More UL-SCH Resources Overlap in the Time Domain

In one implementation, if two or more UL-SCH resources (e.g., PUSCH resource) overlap in the time domain, the UE may select only one UL-SCH resource for transmission.

In one implementation, the UE may transmit on only one UL-SCH resource in the case where two or more UL-SCH resources overlapping each other are allocated in the same UL BWP/serving cell.

In one implementation, the UL-SCH resources which overlap in the time domain may be for a new transmission or retransmission.

In one implementation, the UL-SCH resource may be provided by the network RRC signaling, DCI signaling, preconfigured, etc.

In one implementation, the UL-SCH resource may be either a dynamic grant, a configured grant Type 1/Type 2, an AUL, etc.

In one implementation, the UE may prioritize one of the UL-SCH resources if two or more UL-SCH resources overlap in the time domain.

In one implementation, the UE may suspend/skip/ignore/stop transmitting the UL-SCH resource which has been deprioritized (has not been selected for transmission).

In one implementation, the UE may terminate the ongoing transmission on the UL-SCH resource which has been deprioritized (has not been selected for transmission).

In one implementation, the UE may select the UL-SCH resource that has the highest priority.

In one implementation, if two or more UL-SCH resources overlap in the time domain, the UE may select the UL-SCH resource if this UL-SCH may be used to transmit data from LCH and/or MAC CE (which is ready for transmission), which has the highest LCP order among the overlapping UL-SCH resources. The LCP order may be specified in the 3GPP TS 38.321, version 15.5.0.

In one implementation, the LCP order of a BFR MAC CE may be determined based on Approach 5.

In one implementation, data from LCH and/or MAC CE is ready for transmission may imply that the criterion(s) to generate the MAC subPDU that includes data from the corresponding LCH and/or the criteria to generate the MAC subPDU that includes the corresponding MAC CE has been met.

In one implementation, if the overlapping UL-SCH resources are used to transmit data from an LCH and/or from a MAC CE (which is ready for transmission) with equally highest LCP order, the overlapping resources are considered as having equal priority.

Figure 3:
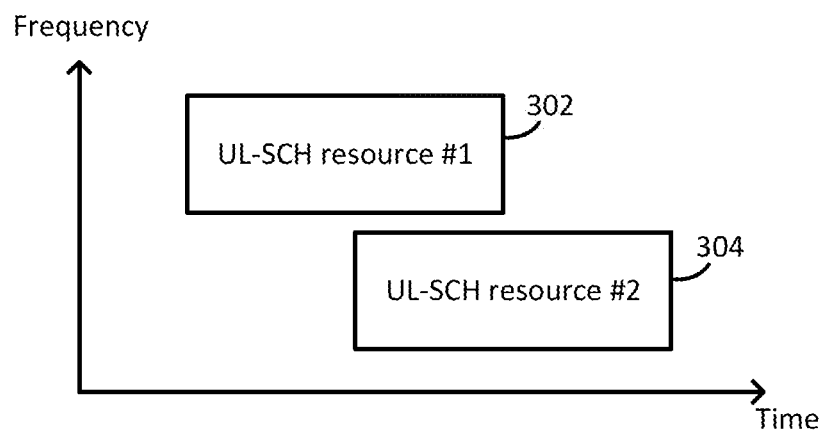
FIG. 3 illustrates an example of prioritization between UL Shared Channel (SCH) (UL-SCH) resources, in accordance with an implementation of the present disclosure.

FIG. 3 illustrates an example of prioritization between UL-SCH resources, in accordance with an implementation of the present disclosure. As illustrated in FIG. 3, a UE has been allocated with two UL-SCH resources (an UL-SCH resource #1 302 and an UL-SCH resource #2 304) for a new transmission that overlap with each other in the time domain. If a BFR MAC CE is to be transmitted on the UL-SCH resource #1 302 and a BSR MAC CE is to be transmitted on the UL-SCH resource #2 304 (this may be under the assumption that the BFR MAC CE and the BSR MAC CE are restricted to be transmitted on the UL-SCH resource #1 302 and the UL-SCH resource #2 304, respectively, based on the restrictions described earlier in the present disclosure), and also if the criteria to generate the BFR MAC CE and the BSR MAC CE have both been met when the UL-SCH resource #1 302 and the UL-SCH resource #2 304 are allocated to the UE (e.g., a BFR-SR (procedure) has been triggered and not canceled; a BSR (procedure) has been triggered and not canceled), the priority of the UL-SCH resource #1 302 and the UL-SCH resource #2 304 may be determined based on the LCP priority order of the BFR MAC CE and the BSR MAC CE, respectively. Accordingly, the UL-SCH resource #1 302 may be prioritized over the UL-SCH resource #2 304. As such, the network can ensure that the BFR MAC CE can be transmitted (it is assumed that the BFR MAC CE is more delay stringent than the BSR MAC CE).

In one implementation, the priority of an UL-SCH resource may be determined based on the specific LCH and/or specific MAC CE, which is ready for transmission (e.g., the criterion(s) to generate the MAC subPDU that includes data from the corresponding LCH and/or the criteria to generate the MAC subPDU that includes the corresponding MAC CE has been met) via the UL-SCH resource, and has the highest configured priority. This implementation may be under the assumption that a MAC CE and an LCH are configured with apriority value.

In one implementation, a specific LCH may be the configured LCH(s) which can be included in a MAC PDU for transmission on the corresponding UL-SCH resource (e.g., the LCP mapping restriction(s) configured for the LCH indicates the data may be transmitted on the corresponding UL-SCH resource). In one implementation, the UL-SCH resource may be considered as having the highest priority (or may be prioritized over other UL-SCH) if the UL-SCH can be used for transmission of a BFR MAC CE (e.g., the characteristics of an UL-SCH satisfies the mapping restriction (if configured/preconfigured) of a BFR MAC CE), and also the condition(s) to generate a BFR MAC CE for transmission on this UL-SCH resource has been satisfied (e.g., a BFR-SR has been triggered and not canceled).

In one implementation, if two or more overlapping UL-SCHs can be used for transmission of a BFR MAC CE, the overlapping UL-SCHs may be considered as having equal priority.

In one implementation, the UL-SCH resource may be considered as having the highest priority if the UL-SCH can be used for transmission of a C-RNTI MAC CE (e.g., the characteristics of an UL-SCH satisfies the mapping restriction (if configured/preconfigured) of a C-RNTI MAC CE), and the condition(s) (e.g., a BFR-SR has been triggered and not canceled) to generate a C-RNTI MAC CE for transmission on this UL-SCH resource has been satisfied.

In one implementation, if two or more overlapping UL-SCHs can be used for transmission of a C-RNTI MAC CE, these overlapping UL-SCHs may be considered as having equal priority.

In one implementation, the UL-SCH resource may be considered as having the highest priority if the UL-SCH is used for transmission of a MAC CE/LCH (e.g., the characteristics of an UL-SCH satisfies the mapping restriction (if configured/preconfigured) of the corresponding MAC CE/LCH) which has been explicitly indicated by the network, and also the corresponding MAC CE/LCH is ready for transmission (e.g., the criterion(s) to generate the MAC subPDU that includes data from the corresponding LCH and/or the criteria to generate the MAC subPDU that includes the corresponding MAC CE has been met). A gNB may provide the indication via RRC signaling, e.g., the LogicalChannelConfig IE, the BSR-Config IE, the PHR-Config IE, the ConfiguredGrantConfig IE, etc. If two UL-SCH resources that overlap in the time domain may include MAC CE(s) and/or LCH(s) explicitly indicated by the network, and these MAC CE(s) and/or LCH(s) is ready for transmission, the priority of the two UL-SCH resources may be considered the same.

In one implementation, the priority of an UL-SCH resource may be explicitly indicated by the network via RRC signaling, DCI signaling, etc.

In one implementation, gNB may indicate the priority value (e.g., 1, 2, 3, 4, etc.) of each UL-SCH via DCI signaling/RRC signaling. When two or more UL-SCH resources overlap in the time domain, the UL-SCH with the highest/lowest priority value may be considered as having the highest priority.

In one implementation, an indication may be provided by the network. The indicated UL-SCH resource(s) may have the highest priority on the corresponding BWP/Cell/subset of CG/CG that the UL-SCH belongs to.

In one implementation, the priority of an UL-SCH resource may be implicitly determined by the resource type, the type of RNTI, the DCI format, the parameter used for configuring the UL-SCH, etc.

In one implementation, an UL-SCH resource associated with a specific RNTI (e.g., MCS C-RNTI) may have the highest priority.

In one implementation, an UL-SCH resource associated with a specific DCI format may have the highest priority.

In one implementation, an UL-SCH resource which has a duration in the time domain of smaller than a threshold may have the highest priority.

In one implementation, an UL-SCH resource scheduled by an UL grant, which was found in a specific search space, may have the highest priority.

In one implementation, an UL-SCH resource scheduled by a mini-slot configuration (e.g., repetition) may have the highest priority.

In one implementation, if two or more time-domain overlapping UL-SCH resources are determined to have equal priority, an UL-SCH resource with one or more or any combination of the following characteristics may be selected for transmission.

The UL-SCH resource corresponds to the highest/lowest Hybrid Automatic Repeat reQuest (HARQ) ID among the overlapping UL-SCH resources.

The UL-SCH resource is transmitted by an LCH (with data available for transmission) with the highest/lowest ID among the overlapping UL-SCH resources.

The UL-SCH resource is transmitted by an LCH that belongs to an LCG (with data available for transmission) with the highest/lowest ID among the overlapping UL-SCH resources.

The UL-SCH resource is associated with a specific MAC CE (that is ready for transmission). For example, an UL-SCH which may be used for transmission of a BFR MAC CE may be selected (if the condition(s) to generate a BFR MAC CE is satisfied).

The UL-SCH resource is explicitly indicated by the network. For example, an UL-SCH indicated (via RRC or DCI signaling) by the network may be selected.

The UL-SCH resource accommodates the most data among the overlapping UL-SCH resources. For example, an UL-SCH resource able to accommodate the most amount of data is selected.

The UL-SCH resource has the shortest/longest length in the time-domain (e.g., PUSCH duration) among the overlapping UL-SCH resources.

The UL-SCH resource is scheduled by an UL grant that is associated with a specific RNTI (e.g., MCS C-RNTI).

The UL-SCH resource is scheduled by an UL grant with a specific DCI format.

The UL-SCH resource is scheduled by an UL grant, which was found in a specific search space.

The UL-SCH resource corresponds to non-slot-based repetition, per explicit/implicit indication from the gNB.

The UL-SCH resource corresponds to a HARQ process ID, which belongs to a specific group, as explicitly/implicitly indicated by the gNB or based on some predefined rule.

The UL-SCH resource is scheduled by an UL grant, in which the K2 value of this UL grant is represented as a value of the symbol, sub-slots, millisecond (ms), or sub-ms.

The UL-SCH resource is scheduled by an UL grant, in which the K2 value of this UL grant is lower/greater than a predefined/preconfigured threshold.

The UL-SCH resource is scheduled by an UL grant with the lowest/largest K2 value among all the UL grants that schedule the overlapping UL resources.

The UL-SCH resource is used for transmission of a BFR MAC CE wherein the failed beam corresponding to a coarse beam (e.g., corresponding to a specific BFD RS ID) as comparing with another UL-SCH used for transmission of a BFR MAC CE intended for a fine beam (e.g., corresponding to a specific BFD RS ID).

In one implementation, the K2 value may correspond to an L1 parameter that is denoted as 'K2' (e.g., specified in the 3GPP TS 38.214, version 15.5.0).

In one implementation, the HARQ ID may be indicated by the DCI field and/or calculated by a formula for a configured grant (e.g., specified in the 3GPP TS 38.321, version 15.5.0).

The specific MAC CE may be the MAC CE that may be included in a MAC PDU for transmission on the corresponding UL-SCH resource (e.g., an indication configured for the MAC CE indicates this MAC CE may be transmitted on the corresponding UL-SCH resource). Moreover, a specific MAC CE type(s) may be a BFR MAC CE, a Configured Grant Confirmation MAC CE, a BFR MAC CE, a MAC CE for BSR except for BSR included for padding, a MAC CE for SL BSR except for SL BSR included for padding, a PHR MAC CE, a MAC CE for Recommended bit rate query, a MAC CE for (SL) BSR included for padding, a MAC CE for SPS/AUL confirmation, etc.

The specific MAC CE may be a MAC CE that is configured with a mapping restriction(s). For example, when configured for a MAC CE, the mapping restriction(s) may restrict the MAC CE to an UL resource with specific characteristic(s). For example, the UL resource may be associated with one or more or any combination of the resource type(s), the BWP index(es), the MCS table(s), the configured grant periodicity(s), the CG/subset of CG, etc. The resource types may include the dynamic UL grant, the configured grant Type 1/Type 2, the AUL, etc.

The MAC CE may be assigned with a priority, e.g., configured by the network or predefined in the 3GPP specification.

The LCP order may be the order to allocate resource to MAC CE/LCH which is ready for transmission (e.g., (LCH) has data available/(MAC CE) has been triggered and not canceled) when generating a MAC PDU for the new transmission. For example, the LCP order may be determined as follows (from the highest LCP order to the lowest LCP order):

C-RNTI MAC CE or data from UL-CCCH;
Configured Grant Confirmation MAC CE;
MAC CE for BSR, except for the BSR included for padding;
Single Entry PHR MAC CE or Multiple Entry PHR MAC CE;
data from any LCH, except data from UL-CCCH;
MAC CE for Recommended bit rate query;
MAC CE for BSR included for padding.

Case 2: UL-SCH Resource Overlap in the Time Domain with PUCCH Resource(s)

In Case 2, for the case where resource overlap between UL-SCH resource and PUCCH resource occurs, the UE selects either UL-SCH resource or PUCCH resource for transmission based on the characteristics of the UL-SCH/PUCCH resource configuration and/or the content that is available for transmission on the UL-SCH/PUCCH resource.

In one implementation, if an UL-SCH resource (e.g., PUSCH resource) overlaps in the time domain with one or more PUCCH resource(s), the UE may select only one UL resource from the UL-SCH resource and the PUCCH resource(s) for transmission.

In one implementation, the UE may transmit on only one UL resource in the case where the UL-SCH resource and the PUCCH resource(s) which overlap are scheduled in the same UL BWP/serving cell.

In one implementation, the UL-SCH resource may be provided by the network RRC signaling, DCI signaling, preconfigured, etc.

In one implementation, the UL-SCH resource may be either a dynamic grant, configured grant Type 1/Type 2, AUL, etc.

In one implementation, the UE may prioritize an UL-SCH resource over a PUCCH resource if the UL-SCH resource overlaps with the PUCCH resource in the time domain.

In one implementation, the UE may suspend/skip/ignore/stop signaling/transmitting the UL resource that has been deprioritized.

In one implementation, the UE may terminate the ongoing transmission on the UL resource that has been deprioritized.

In one implementation, the UE may transmit on either the UL-SCH resource and/or the PUCCH resource that has the highest priority.

In one implementation, the MAC entity or HARQ entity of the UE may indicate to the Multiplexing and Assembly entity to include MAC subPDU(s) carrying a MAC SDU from the deprioritized MAC PDU (e.g., the MAC PDU which is terminated by the UE during ongoing transmission or the MAC PDU which is built but not transmitted) in the subsequent UL transmission.

In one implementation, the UL-SCH resource that is used for transmission of a specific MAC CE may have a higher priority than a specific PUCCH resource configured for SR transmission.

In one implementation, a UE has received an UL-SCH resource #1, which is used for transmission of a BFR MAC CE, and the condition(s) (e.g., the BFR-SR has been triggered and not canceled) has been satisfied to generate the BFR MAC CE for the transmission on the UL-SCH resource #1. Moreover, an SR, which may be transmitted on PUCCH resource #1, has been triggered by an LCH for non-URLLC service or by a specific LCH (e.g., the LCH has a specific priority value). In this example, when the UL-SCH resource #1 and the PUCCH resource #1 overlap in the time domain, the UE may select the UL-SCH resource #1 for transmission.

In one implementation, the UL-SCH resource that may be used for transmission of a specific MAC CE may have a higher priority than a specific PUCCH resource for BFR-SR transmission.

In one implementation, a UE receives an UL-SCH resource #1 used for transmission of a BFR MAC CE, and the condition(s) (e.g., the BFR-SR has been triggered and not canceled) has been satisfied to generate a BFR MAC CE for the transmission on the UL-SCH resource #1. Moreover, a PUCCH resource #1 is configured for the transmission of a BFR-SR. In this example, when the UL-SCH resource #1 and the PUCCH resource #1 overlap in the time domain, the UE may select the UL-SCH resource #1 for transmission. As such, the network may obtain detailed information (BFR MAC CE) from the UE sooner. In one implementation, the BFR-SR may be canceled, but UE may re-assemble a new BFR MAC CE to comprise all failure indications within the CE.

In one implementation, the UL-SCH resource that may be used for transmission of a specific MAC CE may have a higher priority than a PUCCH resource for BFR-SR transmission.

In one implementation, a C-RNTI MAC CE may have a higher priority than a PUCCH resource for BFR-SR transmission. The reason is that a C-RNTI MAC CE may be transmitted by a UE during a Contention Based RA (CBRA) procedure when the UE is in RRC connected state, and a CBRA procedure may be more important than a BFR-SR transmission.

In one implementation, a specific MAC CE may be a MAC CE that is included in a MAC PDU for transmission on the corresponding UL-SCH resource (e.g., an indication configured for the MAC CE indicates this MAC CE may be transmitted on the corresponding UL-SCH resource). Moreover, a specific MAC CE type(s) may be a Configured Grant Confirmation MAC CE, a BFR MAC CE, a MAC CE for BSR except for BSR included for padding, a MAC CE for SL BSR except for SL BSR included for padding, a PHR MAC CE, a MAC CE for Recommended bit rate query, a MAC CE for (SL)BSR included for padding, a MAC CE for SPS/AUL confirmation, etc.

In one implementation, a specific MAC CE may be a MAC CE that is configured with a specific mapping restriction(s). For example, when configured for a MAC CE, the specific mapping restriction(s) may restrict the MAC CE to an UL resource with specific characteristic(s), where the characteristics may be determined by one or more or any combination of the resource type(s), the BWP index(es), the MCS table(s), the configured grant periodicity(s), the CG/subset of CG, etc. The resource type may refer to a dynamic UL grant, a configured grant Type 1/Type 2, an AUL, etc.

In one implementation, a specific MAC CE may be configured with a priority (value), e.g., configured by the network or predefined in the 3GPP specification.

In one implementation, a specific PUCCH resource for SR transmission may have one or more or any combination of the characteristics as listed below:
associated with a specific schedulingRequestId value,
associated with a specific SchedulingRequestResourceId value,
associated with a specific SR periodicity,
associated with a specific SR configuration, and this SR configuration is configured for LCH(s) (e.g., LogicalChannelConfig IE is configured with the schedulingRequestId of the SR configuration) with a specific priority value (e.g., LogicalChannelConfig IE is configured with a priority value), not associated with a specific SR configuration corresponding to URLLC service (the network may indicate whether an SR configuration corresponds to URLLC service), the SR that may be transmitted on the PUCCH resource is not triggered by an LCH with specific characteristics. For example, the characteristics of the LCH may be determined by the LCG ID value, the LCID value, the priority value, the LCP mapping restriction(s), etc. The specific LCP mapping restriction may be allowedSCS-List, maxPUSCH-Duration, configuredGrantType1ALLOWED, allowedServing-Cells, etc., not used for transmission of a BFR-SR.

Case 3: UL-SCH Resource Overlap in the Time Domain with PRACH Resource(s)

For the case where resource overlap between UL-SCH resource and PRACH resource occurs, the UE may select an UL resource (e.g., UL-SCH resource or PRACH resource) for transmission based on the characteristics of the UL-SCH/PRACH resource configuration, the content to be transmitted on the UL-SCH resource, the event that triggered the RA procedure, or any combination thereof.

In one implementation, if an UL-SCH resource (e.g., a PUSCH resource) overlaps in the time domain with one or more PRACH resource(s), the UE may select only one UL resource (i.e., UL-SCH resource or PRACH resource) for transmission.

In one implementation, the UE may transmit on only one UL resource (e.g., UL-SCH resource(s) or PRACH resource(s)) in the case where the UL-SCH resource and the PRACH resource(s) which overlap are scheduled in the same UL BWP/serving cell.

In one implementation, the UL-SCH resource may be provided by the network RRC signaling, DCI signaling, preconfigured, etc.

In one implementation, the UL-SCH resource may be either a dynamic grant, configured grant Type 1/Type 2, AUL, etc.

In one implementation, the UE may prioritize one of the UL-SCH resources or the PRACH resource if the UL-SCH resource overlaps the PRACH resource in the time domain.

In one implementation, the UE may suspend/skip/ignore/stop transmitting/signaling the UL resource that has been deprioritized.

In one implementation, the UE may terminate the ongoing transmission on the UL resource that has been deprioritized.

In one implementation, the UE may transmit on either the UL-SCH resource and/or the PRACH resource that has the highest priority (The priority of an UL-SCH resource may be determined based on the implementations described above).

In one implementation, the UL-SCH resource that may be used for transmission of a specific MAC CE may have higher priority than a PRACH resource, if the PRACH resource is used for a first RA event.

In one implementation, the first RA event may be any of the following RA triggering events:

initial access from RRC_IDLE,
an RRC Connection Re-establishment procedure,
a DL or UL data arrival during RRC_CONNECTED when UL synchronization status is "non-synchronized,
UL data arrival during RRC_CONNECTED when there are no PUCCH resources for an SR configuration which has pending SR,
SR transmission failure (e.g., the number of SR transmissions exceeds a configured maximum number),
request by RRC upon synchronous reconfiguration (e.g., handover),
the transition from RRC_INACTIVE,
to establish time alignment at SCell addition,
request for Other SI, and
BFR.

In one implementation, a UE receives an UL-SCH resource #1 used for transmission of a BFR MAC CE, and the condition(s) (e.g., the BFR-SR has been triggered and not canceled) has been satisfied to generate a BFR MAC CE for the transmission on the UL-SCH resource #1. Moreover, an SR configuration without a valid PUCCH resource has pending SR triggered by a low priority LCH, which leads to an RA procedure, with the corresponding preamble transmission on a PRACH resource #1. In this example, when the UL-SCH resource #1 and the PRACH resource #1 overlap in the time domain, the UE may select the UL-SCH resource #1 for transmission. The reason is that a BFR MAC CE may be more delay stringent than the low priority LCH that initiates the RA procedure. Hence it is desirable to prioritize the BFR MAC CE transmission.

In one implementation, the UL-SCH resource that may be used for transmission of a specific MAC CE may have lower priority than a PRACH resource, if the PRACH resource is used for a second RA event.

In one implementation, the second RA event may be any of the following RA triggering events:

initial access from RRC_IDLE,
an RRC Connection Re-establishment procedure,
a DL or UL data arrival during RRC_CONNECTED when UL synchronization status is "non-synchronized,
UL data arrival during RRC_CONNECTED when there are no PUCCH resources for an SR configuration which has pending SR,
SR transmission failure (e.g., the number of SR transmissions exceed a configured maximum number),
request by RRC upon synchronous reconfiguration (e.g., handover),
the transition from RRC_INACTIVE state,
to establish time alignment at SCell addition,
Request for Other SI, and
BFR.

In one implementation, a UE receives an UL-SCH resource #1 used for transmission of a BFR MAC CE, and the condition(s) (e.g., the BFR-SR has been triggered and not canceled) has been satisfied to generate a BFR MAC CE for the transmission on UL-SCH resource #1. Moreover, an RA procedure initiated upon request by RRC for handover leads to an RA preamble transmission on a PRACH resource #1. In this example, when the UL-SCH resource #1 and the PRACH resource #1 overlap in the time domain, the UE may select the PRACH resource #1 for transmission. The reason is that successful handover may be more important than transmitting a BFR MAC CE.

In one implementation, a UE receives an UL-SCH resource #1 used for transmission of a BFR MAC CE, and the condition(s) (e.g., the BFR-SR has been triggered and not canceled) has been satisfied to generate a BFR MAC CE for the transmission on the UL-SCH resource #1. Moreover, an RA procedure initiated due to BFR leads to an RA preamble transmission on a PRACH resource #1. In this example, when the UL-SCH resource #1 and the PRACH resource #1 overlap in the time domain, the UE may select the PRACH resource #1 for transmission. In another implementation, the prioritization between the UL-SCH containing the BFR MAC CE and the PRACH resource may depend on the RA type (e.g., Contention Free RA (CFRA), CBRA, 2-step RA). For example, CFRA may prioritize an UL-SCH with a BFR MAC CE; CBRA may de-prioritize an UL-SCH with a BFR MAC CE.

In one implementation, the first and/or the second RA event may be the following RA event: RA is triggered due to UL data arrival during RRC_CONNECTED when there are no PUCCH resources for an SR configuration which has pending SR, and the SR is triggered by a priority LCH, where the priority LCH may be an LCH configured with a specific priority or specific mapping restriction (e.g., allowedSCS-List, maxPUSCH-Duration, configuredGrantType1Allowed, allowedServingCells, etc.) or other parameters configured per LCH.

In one implementation, the first and/or the second RA event may be the following RA event: RA is triggered due to UL data arrival during RRC_CONNECTED when there are no PUCCH resources for a specific SR configuration which has pending SR, where the specific SR configuration may be a configuration with a specific schedulingRequestId or schedulingRequestResourceId or any other parameter (e.g., periodicity) that is configured per SR configuration.

In one implementation, a specific MAC CE may be the MAC CE that may be included in a MAC PDU for transmission on the corresponding UL-SCH resource (e.g., an indication configured for the MAC CE indicates this MAC CE may be transmitted on the corresponding UL-SCH resource). Moreover, a specific MAC CE type(s) may be a Configured Grant Confirmation MAC CE, a BFR MAC CE, a MAC CE for BSR except for BSR included for padding, a MAC CE for SL BSR except for SL BSR included for padding, a PHR MAC CE, a MAC CE for Recommended bit rate query, a MAC CE for (SL)BSR included for padding, a MAC CE for SPS/AUL confirmation, etc.

In one implementation, the specific MAC CE may be a MAC CE that is configured with a specific mapping restriction(s). For example, when the specific mapping restriction(s) is configured for a MAC CE, the specific mapping restriction(s) may restrict the MAC CE to an UL resource with specific characteristic(s). For example, the characteristics may be determined by one or more or any combination of the resource type(s), the BWP index(es), the MCS table(s), the configured grant periodicity(s), the CG/subset of CG, etc. The resource types may include the dynamic UL grant, the configured grant Type 1/Type 2, the AUL, etc.

In one implementation, the MAC CE may be configured with a priority, e.g., configured by the network or predefined in the 3GPP specification.

Case 4: UL-SCH Resource Overlap in the Time Domain with a Measurement Gap

In NR Rel-15, a UE may be configured with a measurement gap, e.g., via measGapConfig, on a serving cell. During the measurement gap on the serving cell, the UE may not perform some DL (e.g., PDCCH monitoring, DL-SCH reception) and/or UL transmission (e.g., the transmission of HARQ feedback, SR, CSI, SRS report, UL-SCH transmission), since the UE may need to perform measurements during this time.

In one implementation, whether a measurement is non-gap-assisted or gap-assisted may depend on the capability of the UE, the active BWP of the UE, and the current operating frequency.

For SSB based inter-frequency, a measurement gap configuration may always be provided in the following cases:
if the UE only supports per-UE measurement gaps; and/or
if the UE supports per-Frequency Range (FR) measurement gaps and any of the configured BWP frequencies of any of the serving cells are in the same frequency range of the measurement object.

For SSB based intra-frequency measurement, a measurement gap configuration may always be provided in the following case:
other than the initial BWP, if any of the UE configured BWPs do not contain the frequency domain resources of the SSB associated with the initial DL BWP.

In non-gap-assisted scenarios, the UE may be able to carry out such measurements without measurement gaps. In gap-assisted scenarios, the UE may not be assumed to be able to carry out such measurements without measurement gaps.

However, there may be an exceptional case from NR Release 16 (Rel-16) onwards, if an UL-SCH is used for transmission of a MAC PDU containing delay-sensitive information, e.g., a BFR MAC CE which needs to be transmitted during a BFR procedure (e.g., when a BFR procedure has been triggered). Hence, the UE may or may not perform UL-SCH transmission during the measurement gap based on some conditions.

In one implementation, during the measurement gap, the UE may perform the transmission of an UL-SCH resource if the following information has been included in a MAC PDU, which will be transmitted on this UL-SCH. The specific information may correspond to one or more or any combination of the following:
  a specific MAC CE
  a specific LCH In one implementation, during the measurement gap, the UE may perform the transmission of an UL-SCH resource if the UL-SCH has one or more or any combination of the following characteristics.
  The UL-SCH resource belongs to a specific resource type, e.g., a dynamic UL grant, configured grant Type 1/Type 2, AUL, etc.
  The UL-SCH resource is for transmission of a BFR MAC CE, e.g., UL-SCH resource is scheduled by the network upon the network receives a BFR-SR from the UE.
  The UL-SCH resource is for the transmission of a specific LCH.
  The UL-SCH resource is for transmission of a specific MAC CE.
  The UL-SCH resource is associated with a specific RNTI type, DCI format, MCS-table (e.g., qam64LowSE or other low BLER MCS table), or any combination thereof.
  The UL grant that schedules the corresponding UL-SCH resource is received by the UE on a specific search space.
  The UL-SCH resource belongs to a configured UL grant (e.g., configured grant Type 1/Type 2, AUL, etc.), and the periodicity between each UL-SCH resource transmission of the corresponding configured UL grant is smaller than a threshold. Here, the periodicity and the threshold may be configured by the network or preconfigured by the UE.
  The UL-SCH resource is associated with a specific RNTI type, DCI format, MCS-table (e.g., qam64LowSE or other low BLER MCS table), time-domain duration, or any combination thereof.

In one implementation, the specific MAC CE may be the MAC CE that may be included in a MAC PDU for transmission on the corresponding UL-SCH resource (e.g., an indication configured for the MAC CE indicates this MAC CE may be transmitted on the corresponding UL-SCH resource). Moreover, a specific MAC CE type(s) may be a Configured Grant Confirmation MAC CE, a BFR MAC CE, a MAC CE for BSR except for BSR included for padding, a MAC CE for SL BSR except for SL BSR included for padding, a PHR MAC CE, a MAC CE for Recommended bit rate query, a MAC CE for (SL) BSR included for padding, a MAC CE for SPS/AUL confirmation, etc.

In one implementation, the specific LCH may have a specific mapping restriction(s), e.g., a mapping restriction(s), when configured for an LCH, that restricts the LCH to an UL resource with specific characteristic(s). For example, the characteristic(s) may be determined by one or more or any combination of the resource type(s), the BWP index(es), the MCS table(s) (e.g., qam64LowSE or other low BLER MCS table), the configured grant periodicity(s), the CG/subset of CG, etc. The resource types may include the dynamic UL grant, the configured grant Type 1/Type 2, the AUL, etc.

In one implementation, the behaviors of a UE that is configured with a measurement gap may be based on Table 3 and Table 4.

TABLE 3

Example

During a measurement gap, the MAC entity shall, on the Serving Cell(s) in the corresponding frequency range of the measurement gap configured by measGapConfig as specified in TS 38.331 version 15.5.0:
    1>not perform the transmission of HARQ feedback, SR, and CSI;
    1>not report SRS;
    1>not transmit on UL-SCH except for Msg3 or a BFR MAC CE may be transmitted on the
       UL-SCH;
    1>if the ra-ResponseWindow or the ra-ContentionResolutionTimer is running:
       2>monitor the PDCCH for an RAR message or Response of Msg3.
    1>else:
       2>not monitor the PDCCH;
       2>not receive on DL-SCH.

TABLE 4

Example

During a measurement gap, the MAC entity shall, on the Serving Cell(s) in the corresponding frequency range of the measurement gap configured by measGapConfig as specified in TS 38.331 version 15.5.0:
    1>not perform the transmission of HARQ feedback, SR, and CSI;
    1>not report SRS;
    1>not transmit on UL-SCH except for Msg3 or the UL-SCH is received as a result of BFR-
       SR transmission;
    1>if the ra-ResponseWindow or the ra-ContentionResolutionTimer is running:
       2>monitor the PDCCH for an RAR message or Response of Msg3.
    1>else:
       2>not monitor the PDCCH;
       2>not receive on DL-SCH.

In one implementation, the specific MAC CE may be a MAC CE that is configured with a specific mapping restriction(s). For example, when configured for a MAC CE, the mapping restriction(s) may restrict the MAC CE to an UL resource with specific characteristic(s). For example, the characteristic(s) may be determined by one or more or any combination of the resource type(s), the BWP index(es), the MCS table(s) (e.g., qam64LowSE or other low BLER MCS table), the configured grant periodicity(s), the CG/subset of CG, etc. The resource types may include the dynamic UL grant, the configured grant Type 1/Type 2, the AUL, etc.

In one implementation, the specific MAC CE may be configured with a priority, e.g., configured by the network or predefined in the 3GPP specification.

In one implementation, the specific LCH may have a configured priority of higher/lower than a specific value.

In one implementation, the specific LCH may have a specific mapping restriction(s), e.g., one or more or any combination of allowedSCS-List, maxPUSCH-Duration, configuredGrantType1Allowed, and allowedServingCells.

Contents of a BFR MAC CE

In one implementation, if a beam failure event is detected on one cell. The UE may, upon reception of an UL-SCH resource that is available for transmission of a BFR MAC CE, generate and report a BFR MAC CE.

In one implementation, the BFR MAC CE may only be generated if the criterion to generate a BFR MAC CE is satisfied. The criterion may be that a BFR-SR has been triggered and is not canceled.

In one implementation, if a BFD RS is configured to detect a single cell, and a beam failure event is detected on this cell, the BFR MAC CE may include information (e.g., failed cell information) of this cell.

For example, if a BFD RS #1 is configured to detect a cell #1, and a beam failure event is detected on the cell #1, the BFR MAC CE may include information (e.g., failed cell information) of cell #1.

In one implementation, if a BFD RS is configured to detect a CG (e.g., includes two or more cells), and a beam failure event is detected on this CG, the BFR MAC CE may include information of this CG (e.g., failed CG information).

In one implementation, one BFR MAC CE may include information (e.g., failed cell information) of each cell that belongs to this CG.

In one implementation, one BFR MAC CE may include information of one specific cell.

The specific cell may be a cell with the largest/smallest cell index of all cell indexes that belong to this CG.

Alternately, multiple BFR MAC CE may be generated, and each BFR MAC CE may include information (e.g., NBI, failed cell information, etc.) of a cell that belongs to this CG.

For example, if a BFD RS #1 is configured to detect a CG #1 (includes a cell #1 and a cell #2), and a beam failure event is detected on the CG #1, a BFR MAC CE that includes information for the CG #1 (e.g., NBI, failed CG information, etc.) may be generated and reported.

In one implementation, a BFR MAC CE that includes information (e.g., failed cell information, etc.) of the cell #1 and the cell #2 may be generated and reported.

In one implementation, a BFR MAC CE that includes information (e.g., failed cell information, etc.) of only the cell #1 (e.g., the smallest of all cell indexes that belong to the CG #1) may be generated and reported.

In one implementation, a BFR MAC CE that includes information (e.g., failed cell information, etc.) of only the cell #2 (e.g., the largest of all cell indexes that belong to the CG #1) may be generated and reported.

In one implementation, two BFR MAC CEs may be generated and reported. One of the two BFR MAC CEs may include information (e.g., failed cell information, etc.) of the cell #1, and the other may include information of the cell #2.

In one implementation, a beam failure event may be detected on one cell. Furthermore, only one NBI RS (SSB/CSI-RS), configured for this cell, may fulfill the criterion(s) (e.g., the L1-RSRP measurement on this NBI RS (SSB/CSI-RS) is higher than a threshold) to be selected as a new serving beam. The BFR MAC CE may include the information of this beam (NBI RS), e.g., SSB ID/CSI-RS ID corresponding to this beam.

In one implementation, a beam failure event may be detected on one cell. Furthermore, more than one NBI RS (SSB/CSI-RS), configured for this cell, may fulfill the criterion(s) (e.g., the L1-RSRP measurement on this NBI RS is higher than a threshold) to be selected as a new serving beam. The BFR MAC CE may include information of all candidate new serving beams (NBI RSs) that may be selected as a new serving beam, e.g., SSB ID(s) and/or CSI RS ID(s) corresponding to these beams.

In one implementation, the BFR MAC CE may include the information of only a specific beam (CSI-RS/SSB), e.g., SSB ID/CSI-RS ID of the specific beam.

In one implementation, the specific beam may be one CSI-RS/SSB that corresponds to the list of candidate new serving beams.

In one implementation, the specific beam may be a CSI-RS with the largest/smallest CSI-RS ID, of one/multiple CSI-RS(s) from the list of candidate new serving beams, if this list consists of one/multiple CSI-RS(s).

In one implementation, the specific beam may be an SSB with the largest/smallest SSB ID, of one/multiple SSB(s) from the list of candidate new serving beams, if this list consists of one/multiple SSB(s).

In one implementation, the specific beam may be a CSI-RS/SSB with the highest L1-RSRP measurement result, of the list of candidate new serving beams.

In one implementation, a beam failure event may be detected on one cell. Furthermore, no NBI RS(s) (SSB(s) and/or CSI-RS(s)), configured for this cell, may fulfill the criterion(s) (e.g., the L1-RSRP measurement on this NBI RS is higher than a threshold) to be selected as a new serving beam. The BFR MAC CE may include information of the serving cell where a beam failure event is detected, and inform, via BFR MAC CE, that no new serving beam is found on the corresponding cell where a beam failure event is detected.

In one implementation, a specific index on the BFR MAC CE may be used to represent that no new serving beam is found on the serving cell where a beam failure event is detected.

In one implementation, a beam failure event may be detected on a group of multiple cells. Moreover, an NBI-RS (SSB/CSI-RS) configured for this group may fulfill the criterion(s) (e.g., the L1-RSRP measurement on this NBI RS is higher than a threshold) to be selected as a new serving beam. The BFR MAC CE may only need to report the information of one cell that belongs to this cell group and the NBI-RS (SSB/CSI-RS) that corresponds to this cell group.

In one implementation, the BFR MAC CE may be identified by a specific LCID. In one implementation, the BFR MAC CE may include a bitmap, and each bit may be mapped to an SCell/SpCell to indicate whether a beam failure event is detected for the corresponding SCell/SpCell.

In one implementation, the BFR MAC CE may include a bitmap, and each bit may be mapped to a group of multiple cells to present whether a beam failure event is detected for the corresponding group.

In one implementation, the BFR MAC CE may have a fixed size of zero bits. That is, only a specific MAC subheader is represented as the BFR MAC CE.

In one implementation, the failed cell information, NBI, and/or NBI RS may be indicated by the field(s) within the MAC subheader of the BFR MAC CE.

In one implementation, the CC may be a PCell, a PSCell, and/or an SCell.

In one implementation, the SpCell may include the PCell (s) and the PSCell(s).

In one implementation, the UL resource may be PRACH resource, PUCCH resource, and/or PUSCH resource. The UL resource may be scheduled by a dynamic grant (e.g., via a PDCCH) and/or configured by RRC (e.g., type 1/type 2 configured UL grant or preconfigured in RRC configuration). When a beam failure event (of an SCell(s)) is detected, the UE may trigger a BFR procedure (for an SCell(s)).

In one implementation, the BFR procedure mentioned above may be used to recover the beam failure of SpCell(s) or SCell(s).

In one implementation, the RACH-based BFR procedure may be performed based on the CFRA procedure and/or CBRA procedure. The RACH-based BFR procedure is triggered when the corresponding RA procedure is initiated. The RACH-based BFR procedure is ongoing when the corresponding RA procedure is ongoing. The RACH-based BFR procedure is stopped when the corresponding RA procedure is stopped. The RACH-based BFR procedure is completed when the corresponding RA procedure is completed.

In one implementation, the BFR procedure may be performed based on BFR-SR. The BFR procedure is initiated when the corresponding BFR-SR is triggered. The BFR procedure is ongoing when the corresponding BFR-SR is pending. The BFR procedure is stopped when the corresponding BFR-SR is canceled.

In one implementation, the NBI RS may be an SSB or a CSI-RS configured by the network.

In one implementation, the MAC entity may correspond to the UE.

In one implementation, the BFR-SR transmission in the BFRQ operation (e.g., action 1A illustrated in FIG. 1) of the BFR procedure mentioned in this disclosure may be replaced by PRACH transmission. For example, in the first step of the BFRQ, the UE may perform PRACH transmission (e.g., transmit preamble) to request an UL resource for the BFR report.

In one implementation, the transmission of the BFR report MAC CE in the BFRQ operation (e.g., action 2A illustrated in FIG. 1) of the BFR procedure may be replaced by transmitting UCI. For example, the BFR-related information (e.g., (failed) CC (or cell) information (e.g., cell index), (failed) set/group(s) of cells (e.g., the set/group may be preconfigured by the network), (failed) TRP information, the corresponding measurement result (e.g., RSRP, SINR, etc.) of the (failed) CC, set/group of cells, TRP, Candidate beam information (or new beam information), e.g., one or more qualified beam based on measuring NBI RS, no new beam information (e.g., if there is no new beam with RSRP higher than a threshold for the (failed) CC, set/group of cells, TRP, etc.)) may be included in a UCI.

In one implementation, the UE may only use the specific UL resource for transmitting the BFR report (MAC CE). The specific UL resource may be provided by a specific UL grant. For example, the specific UL grant may include an indication that this UL grant is used for a BFR report (MAC CE) transmission. The specific UL grant may be a specific size.

For example, the specific UL grant may have the same size as the BFR report (including the sub-header of the BFR report). The scheduling (e.g., PDCCH) of the UL grant may be sent on specific timing, e.g., a specific timing after BFR-SR transmission or within a specific window or when a specific timer is running (the specific timer may be started when BFR-SR is transmitted).

For example, the specific timing may be the first UL grant received after triggering the BFR-SR or after signaling the BFR-SR. The specific UL resource(s) may have a specific PUSCH duration, e.g., the PUSCH duration of the specific UL resource(s) is lower than a threshold. The specific UL resource(s) may be mapped to a specific cell.

In one implementation, the specific UL resource(s) may be implicitly or explicitly indicated for BFR reporting. The specific UL resource(s) may be scheduled via a specific UL grant, wherein the specific UL grant may indicate the information that the UL resource(s) is for BFR.

In one implementation, the UL grant may be scheduled by a DCI scrambled with a specific RNTI. The UL grant may be scheduled by the DCI with a specific DCI format. The UL grant may be scheduled by a DCI with a specific field to indicate the specific information.

In one implementation, the specific UL resource(s) may satisfy some specific rules based on one or more or any combination of the following conditions (for BFR report), e.g., allowedSCS-List, maxPUSCH-Duration, configuredGrantType1Allowed, and/or allowedServing-Cells. If the UL resource satisfies the specific rule(s), the UE may generate the BFR report and include the BFR report in the UL resource. If the UL resource does not satisfy one of the specific rule(s), the UE may not generate the BFR report. The specific rules may be configured in the configuration of BFR-SR or BFR configuration.

In one implementation, the specific UL resource(s) may be associated with a specific UL configured grant configuration (e.g., configuration ID or type1/type2). For example, the specific UL configured grant configuration may be configured for BFR report transmission. If the available UL resource is a configured grant which is mapped to a specific configured grant configuration, the UE may generate the BFR report and include the BFR report in the UL resource. The gNB may indicate, via RRC or DCI signaling, that the configured grant configuration is a specific configured grant configuration.

In one implementation, a MAC entity or a UE may be configured with zero, one, or more BFR-SR configurations. A BFR-SR configuration may include a set of PUCCH resources for SR across different BWPs and cells.

In one implementation, the overlap of the resource may mean partially overlapped and/or fully overlapped.

Figure 4:
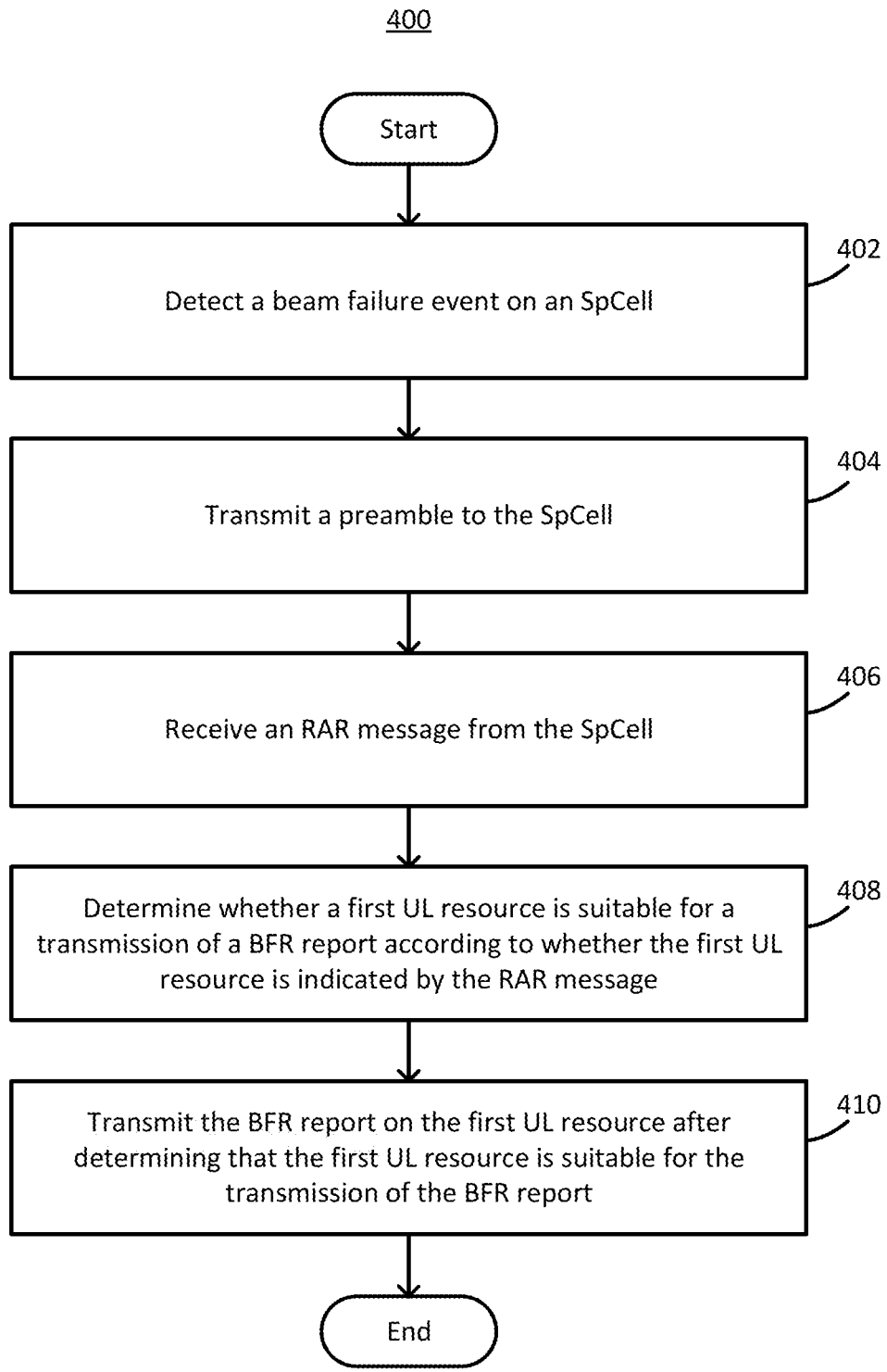
FIG. 4 illustrates a flowchart for a method for UL transmission prioritization, in accordance with an implementation of the present disclosure.

FIG. 4 illustrates a flowchart for a method 400 for UL transmission prioritization, in accordance with an implementation of the present disclosure. Although actions 402, 404, 406, 408, and 410 are delineated as separate actions represented as independent blocks in FIG. 4, these separately delineated actions should not be construed as necessarily order dependent. The order in which the actions are performed in FIG. 4 is not intended to be construed as a limitation, and any number of the described blocks may be combined in any order to implement the method or an alternate method. Moreover, one or more of actions 402, 404, 406, 408, and 410 may be omitted in some of the present implementations.

In action 402, a UE may detect a beam failure event on an SpCell. For example, the PHY layer of the UE may measure the radio link quality to the SpCell according to the BFD RS, and provide a beam failure instance indication (for the SpCell) to the MAC entity of the UE when the radio link quality is lower than a threshold within a predetermined period of time. The beam failure event may be detected on the SpCell when the number of the (consecutive) detected beam failure instance indications exceeds a configured maximum number (e.g., beamFailureInstanceMaxCount). In one implementation, a counter may be used for the SpCell, which counts the number of beam failure instance indications on the SpCell (e.g., BFI COUNTER). The counter may be incremented by 1 whenever the MAC entity of the UE receives a beam failure instance indication (for the SpCell) from the PHY layer of the UE.

In response to detecting the beam failure event (on an SpCell) in action 402, the UE may perform operations including one or more of actions 404, 406, 408, and 410.

As illustrated in FIG. 4, in action 404, the UE may transmit a preamble to the SpCell. The preamble may be an RA preamble used in a 2-step RA procedure or a 4-step RA procedure. For example, in a 2-step RA procedure, the messages may be identified as Message A (msgA) (e.g., including an RA preamble and a PUSCH payload) and Message B (msgB) (e.g., an RAR). Thus, if a 2-step RA procedure is applied, the preamble transmitted to the SpCell may be contained in msgA. On the other hand, in a 4-step RA procedure, the messages may be identified as Message 1 (msg1) (e.g., an RA preamble), Message 2 (msg2) (e.g., an RAR), Message 3 (msg3) (e.g., an RRC connection request), and Message 4 (msg4) (e.g., an RRC contention setup/resolution message). In this case, the preamble transmitted to the SpCell may be contained in msg1.

In action 406, the UE may receive an RAR message from the SpCell. As a response of the preamble transmitted in action 404, the RAR message may be contained in msgB or msg2, depending on which type of RA procedure is applied (e.g., a 2-step RA procedure or a 4-step RA procedure). The UE may monitor the RAR message in an RAR window that starts at the subframe that contains the end of the preamble transmission.

In action 408, the UE may determine whether a first UL resource is suitable for a transmission of a BFR report according to whether the first UL resource is indicated by the RAR message. Details of the determination are described with reference to FIG. 5.

In action 410, the UE may transmit the BFR report on the first UL resource after determining that the first UL resource is suitable for the transmission of the BFR report. In one implementation, only when the first UL resource is considered as an UL resource suitable for the transmission of the BFR report, the UE may use the first UL resource to transmit the BFR report.

Figure 5:
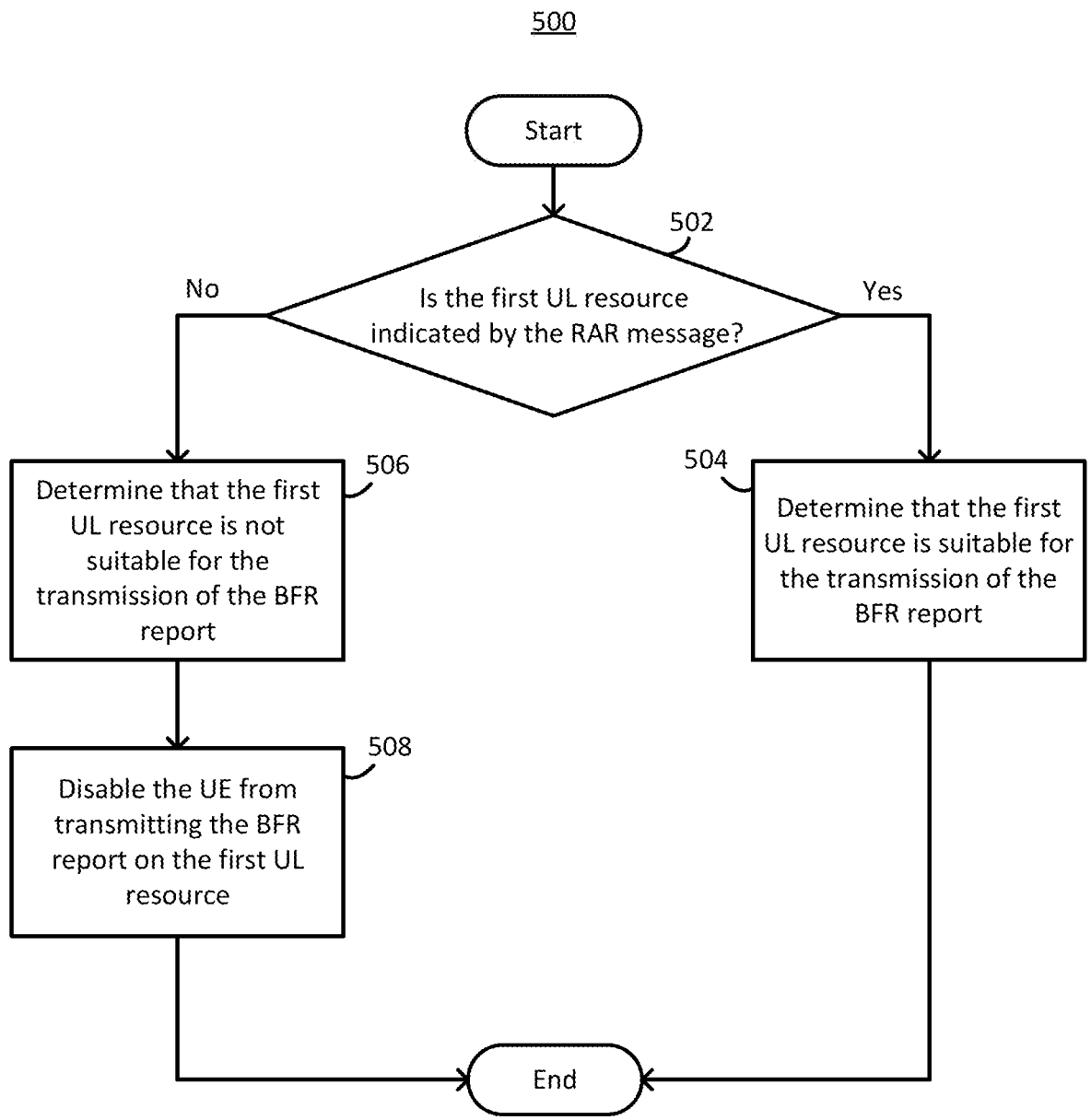
FIG. 5 illustrates a flowchart for a method for UL transmission prioritization, in accordance with an implementation of the present disclosure.

FIG. 5 illustrates a flowchart for a method 500 for UL transmission prioritization, in accordance with an implementation of the present disclosure. The method 500 may be performed by a UE independently, or in combination with the method(s)/implementation(s) described in the present disclosure. Although actions 502, 504, 506, and 508 are delineated as separate actions represented as independent blocks in FIG. 5, these separately delineated actions should not be construed as necessarily order dependent. The order in which the actions are performed in FIG. 5 is not intended to be construed as a limitation, and any number of the described blocks may be combined in any order to implement the method or an alternate method. Moreover, one or more of the actions 502, 504, 506, and 508 may be omitted in some of the present implementations.

In action 502, the UE may determine whether the first UL resource is indicated by the RAR message (e.g., by checking whether the first UL resource is indicated by an UL grant contained in the RAR message).

In action 504, if the outcome of action 502 is Yes (e.g., when the first UL resource is indicated by the UL grant in the RAR message), the UE may determine that the first UL resource is suitable for the transmission of the BFR report.

In action 506, if the outcome of action 502 is No (e.g., when the first UL resource is not indicated by the RAR message), the UE may determine that the first UL resource is not suitable for the transmission of the BFR report.

In action 508, the UE may be disabled/prevented from transmitting the BFR report on the first UL resource after determining that the first UL resource is not suitable for the transmission of the BFR report.

Figure 6:
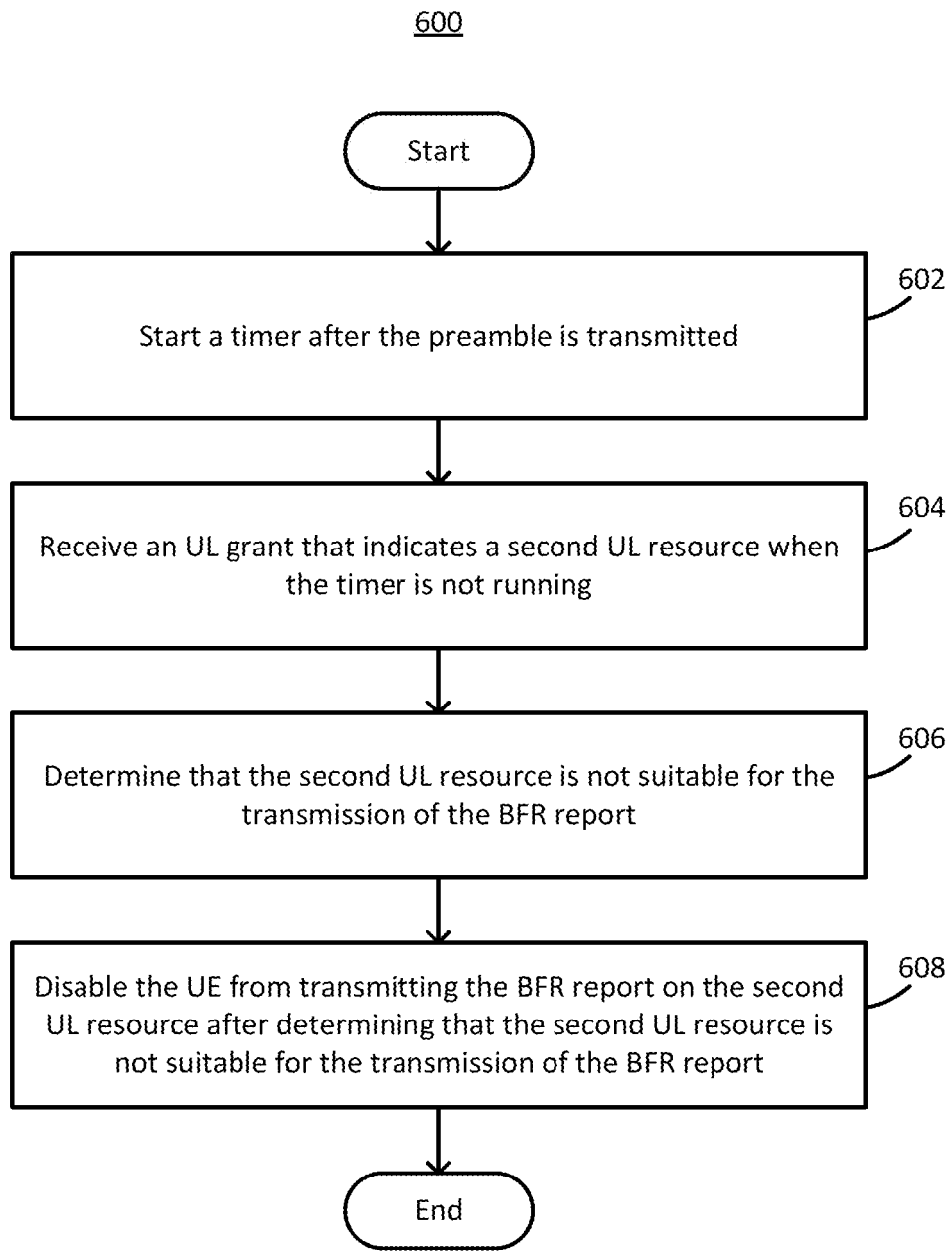
FIG. 6 illustrates a flowchart for a method for UL transmission prioritization, in accordance with an implementation of the present disclosure.

FIG. 6 illustrates a flowchart for a method 600 for UL transmission prioritization, in accordance with an implementation of the present disclosure. The method 600 may be performed by a UE independently, or in combination with the method(s)/implementation(s) described in the present disclosure. Although actions 602, 604, 606, and 608 are delineated as separate actions represented as independent blocks in FIG. 6, these separately delineated actions should not be construed as necessarily order dependent. The order in which the actions are performed in FIG. 6 is not intended to be construed as a limitation, and any number of the described blocks may be combined in any order to implement the method, or an alternate method. Moreover, one or more of the actions 602, 604, 606, and 608 may be omitted in some of the present implementations.

In action 602, a UE may start a timer after the preamble (e.g., an RA preamble) is transmitted. The timer may be used to determine the length of an RAR window for monitoring an RAR message for the preamble. For example, the UE may start the timer at the subframe that contains the end of the preamble transmission. If the UE does not receive the RAR message before the timer expires, the UE may determine that the RAR message reception has failed.

In action 604, the UE may receive an UL grant that indicates a second UL resource when the timer is not running. For example, the UL grant may be received before or after the RAR window for the RAR message. In this case, the UE may identify that the UL grant that indicates the second UL resource is not provided by an RAR message.

In action 606, the UE may determine that the second UL resource is not suitable for the transmission of the BFR report.

In action 608, the UE may be disabled/prevented from transmitting the BFR report on the second UL resource after determining that the second UL resource is not suitable for the transmission of the BFR report.

Figure 7:
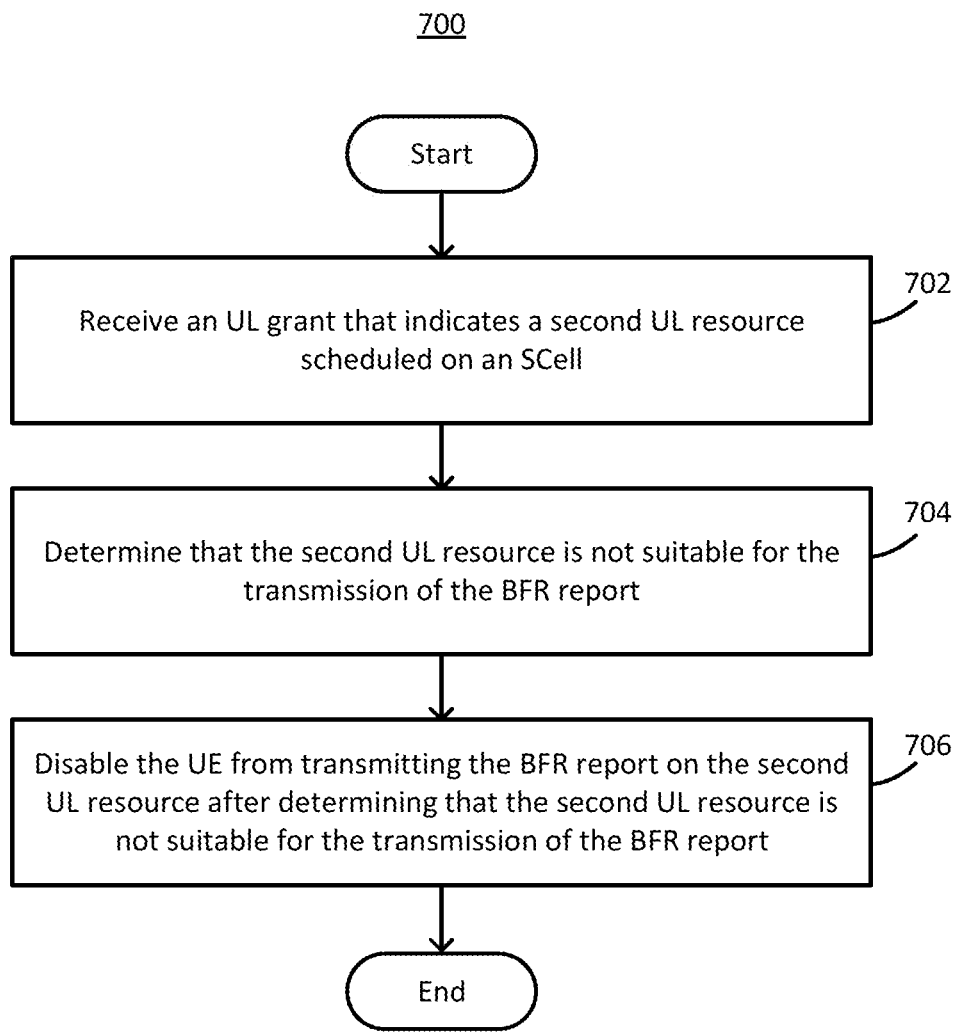
FIG. 7 illustrates a flowchart for a method for UL transmission prioritization, in accordance with an implementation of the present disclosure.

FIG. 7 illustrates a flowchart for a method 700 for UL transmission prioritization, in accordance with an implementation of the present disclosure. The method 700 may be performed by a UE independently, or in combination with the method(s)/implementation(s) described in the present disclosure. Although actions 702, 704, and 706 are delineated as separate actions represented as independent blocks in FIG. 7, these separately delineated actions should not be construed as necessarily order dependent. The order in which the actions are performed in FIG. 7 is not intended to be construed as a limitation, and any number of the described blocks may be combined in any order to implement the method, or an alternate method. Moreover, one or more of the actions 702, 704, and 706 may be omitted in some of the present implementations.

In the present implementation, a UE may determine whether an UL resource is suitable for BFR report transmission based on the cell that schedules the UL resource. For example, an UL resource that is scheduled by an SCell may be considered as an UL resource non-suitable for the BFR report transmission.

As illustrated in FIG. 7, in action 702, a UE may receive an UL grant that indicates a second UL resource scheduled on an SCell.

In action 704, the UE may determine that the second UL resource is not suitable for the transmission of the BFR report.

In action 706, the UE may be disabled/prevented from transmitting the BFR report on the second UL resource after determining that the second UL resource is not suitable for the transmission of the BFR report.

Figure 8:
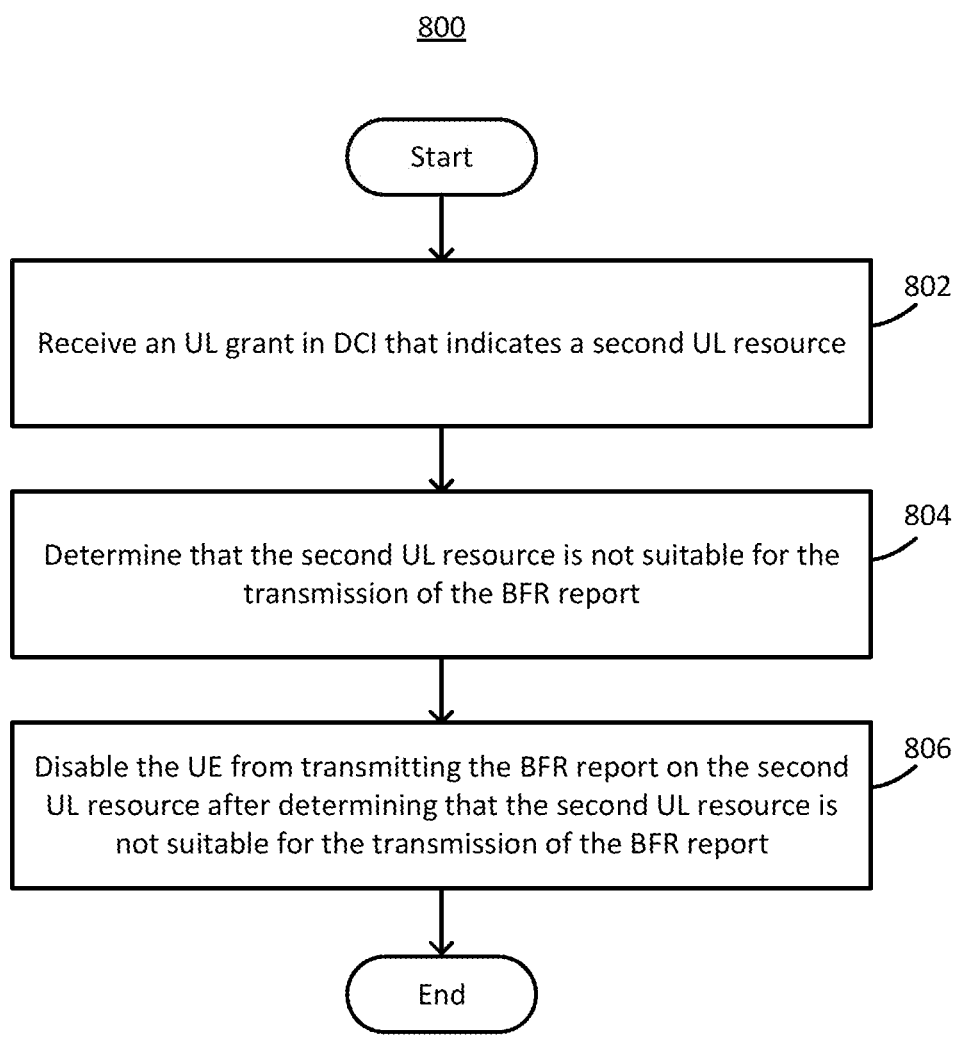
FIG. 8 illustrates a flowchart for a method for UL transmission prioritization, in accordance with an implementation of the present disclosure.

FIG. 8 illustrates a flowchart for a method 800 for UL transmission prioritization, in accordance with an implementation of the present disclosure. The method 800 may be performed by a UE independently, or in combination with the method(s)/implementation(s) described in the present disclosure. Although actions 802, 804, and 806 are delineated as separate actions represented as independent blocks in FIG. 8, these separately delineated actions should not be construed as necessarily order dependent. The order in which the actions are performed in FIG. 8 is not intended to be construed as a limitation, and any number of the described blocks may be combined in any order to implement the method, or an alternate method. Moreover, one or more of the actions 802, 804, and 806 may be omitted in some of the present implementations.

In the present implementation, a UE may determine whether an UL resource is suitable for BFR report transmission based on the DCI format of the DCI that indicates/schedules the UL resource, and/or based on whether the UL resource is indicated by DCI. For example, an UL resource that is indicated by the DCI with DCI format 0_0 or DCI format 0_1 may be considered as an UL resource non-suitable for BFR report transmission.

As illustrated in FIG. 8, in action 802, a UE may receive an UL grant in DCI that indicates a second UL resource. In one implementation, the DCI may have DCI format 0_0, DCI format 0_1, or DCI format 0_2.

Because the second UL resource is indicated by an UL grant in the DCI, but not an UL grant in the RAR message, the UE may determine that the second UL resource is not suitable for the transmission of the BFR report in action 804.

In action 806, the UE may be disabled/prevented from transmitting the BFR report on the second UL resource after determining that the second UL resource is not suitable for the transmission of the BFR report.

In one implementation, a BFR report may include a bitmap that contains a first bit and at least one second bit. The first bit may indicate whether a beam failure event is detected on an SpCell, and each of the at least one second bit may indicate whether a beam failure event is detected on a corresponding SCell.

For example, the BFR report may include an SpCell (SP) field and several $C_i$ fields (e.g., $C_1$ to $C_7$). The SP field may be represented by a first bit to indicate whether a beam failure event is detected on an SpCell. For example, the first bit may be set to "1" to indicate that a beam failure event is detected on an SpCell, and set to "0" to indicate that no beam failure event is detected on the SpCell. Each $C_i$ field may be represented by a second bit to indicate whether a beam failure event is detected on a corresponding SCell #i. For example, a second bit in the $C_1$ field may be set to "1" to indicate that a beam failure event is detected on the corresponding SCell #1, and set to "0" to indicate that there is no beam failure event detected on the SCell #1; a second bit in the $C_2$ field may be set to "1" to indicate that a beam failure event is detected on the corresponding SCell #2, and set to "0" to indicate that there is no beam failure event detected on the SCell #2, and so on.

The first bit and the second bit(s) contained in the BFR report may form a bitmap. For example, when the first and second bits in the fields [$C_7$, $C_6$, $C_5$, $C_4$, $C_3$, $C_2$, $C_1$, SP] are set to [0, 0, 0, 1, 0, 1, 0, 1], respectively, the UE may know that beam failure occurs (e.g., a beam failure event is detected) on the SpCell (corresponding to the SP field), the SCell #2 (corresponding to the $C_2$ field), and the SCell #4 (corresponding to the $C_4$ field), and no beam failure event is detected on the SCells (if exist) corresponding to the remaining $C_i$ fields.

With the bitmap, the UE may use a single BFR report to indicate the beam failure detection on the SpCell and the SCell(s). For example, when a beam failure event(s) is detected on an SpCell and an SCell, the UE may set a first bit (corresponding to the SpCell) and a second bit (corresponding to the SCell) to the same value (e.g., "1").

Figure 9:
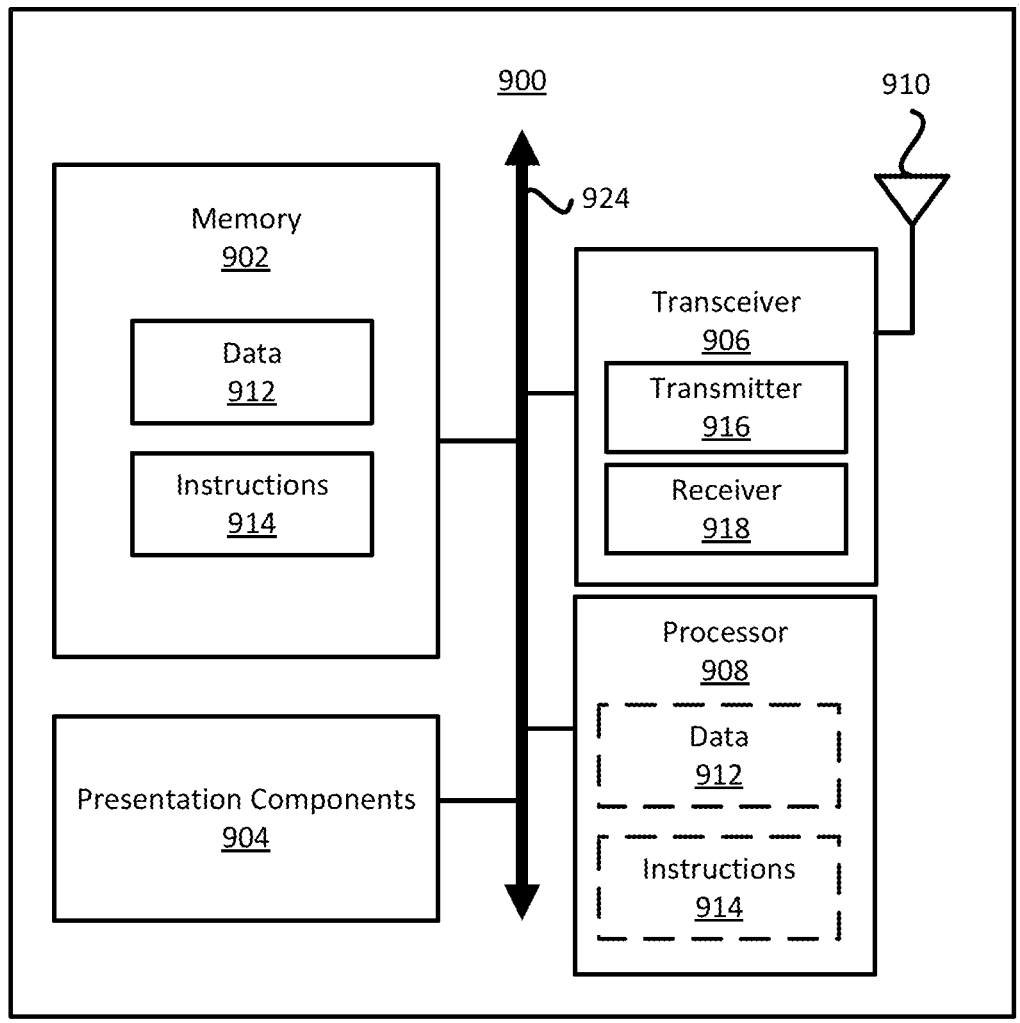
FIG. 9 illustrates a block diagram of a node for wireless communication in accordance with various aspects of the present disclosure.

FIG. 9 illustrates a block diagram of a node for wireless communication in accordance with various aspects of the present disclosure. As illustrated in FIG. 9, a node 900 may include a transceiver 906, a processor 908, a memory 902, one or more presentation components 904, and at least one antenna 910. The node 900 may also include a Radio Frequency (RF) spectrum band module, a BS communications module, a network communications module, and a system communications management module, Input/Output (I/O) ports, I/O components, and power supply (not explicitly illustrated in FIG. 9). Each of these components may be in communication with each other, directly or indirectly, over one or more buses 924. In one implementation, the node 900 may be a UE or a BS that performs various functions described herein, for example, with reference to FIGS. 1 through 8.

The transceiver 906 having a transmitter 916 (e.g., transmitting/transmission circuitry) and a receiver 918 (e.g., receiving/reception circuitry) may be configured to transmit and/or receive time and/or frequency resource partitioning information. In one implementation, the transceiver 906 may be configured to transmit in different types of subframes and slots including, but not limited to, usable, non-usable, and flexibly usable subframes and slot formats. The transceiver 906 may be configured to receive data and control channels.

The node 900 may include a variety of computer-readable media. Computer-readable media can be any available media that can be accessed by the node 900 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The memory 902 may include computer-storage media in the form of volatile and/or non-volatile memory. The memory 902 may be removable, non-removable, or a combination thereof. For example, the memory 902 may include solid-state memory, hard drives, optical-disc drives, etc. As illustrated in FIG. 9, the memory 902 may store computer-readable and/or -executable instructions 914 (e.g., software codes) that are configured to, when executed, cause the processor 908 to perform various functions described herein, for example, with reference to FIGS. 1 through 8. Alternatively, the instructions 914 may not be directly executable by the processor 908 but may be configured to cause the node 900 (e.g., when compiled and executed) to perform various functions described herein.

The processor 908 (e.g., having processing circuitry) may include an intelligent hardware device, a Central Processing Unit (CPU), a microcontroller, an ASIC, etc. The processor 908 may include memory. The processor 908 may process the data 912 and the instructions 914 received from the memory 902, and information through the transceiver 906, the baseband communications module, and/or the network communications module. The processor 908 may also process information to be sent to the transceiver 906 for transmission through the antenna 910, to the network communications module for transmission to a core network.

One or more presentation components 904 may present data indications to a person or other device. Examples of presentation components 904 may include a display device, speaker, printing component, vibrating component, etc.

From the present disclosure, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A method performed by a User Equipment (UE) for Uplink (UL) transmission prioritization, the method comprising:
   receiving a Radio Resource Control (RRC) message;
   detecting a beam failure event on a Special Cell (SpCell); and
   performing operations in response to detecting the beam failure event, the operations comprising:
      transmitting a preamble to the SpCell;
      receiving a Random Access Response (RAR) message from the SpCell;
      determining whether a first UL resource is enabled for transmission of a Beam Failure Recovery (BFR) report according to whether the first UL resource is indicated by the RAR message and whether the RRC message is configured with an indication; and
      transmitting the BFR report on the first UL resource after determining that the first UL resource is enabled for the transmission of the BFR report.

2. The method of claim 1, further comprising:
   determining that the first UL resource is enabled for the transmission of the BFR report when the first UL resource is indicated by the RAR message and the RRC message is configured with the indication.

3. The method of claim 1, further comprising:
   starting a timer after the preamble is transmitted;
   receiving an UL grant that indicates a second UL resource when the timer is not running;
   determining that the second UL resource is not enabled for the transmission of the BFR report; and
   disabling the UE from transmitting the BFR report on the second UL resource after determining that the second UL resource is not enabled for the transmission of the BFR report.

4. The method of claim 1, further comprising:
   receiving an UL grant that indicates a second UL resource scheduled on a Secondary Cell (SCell);
   determining that the second UL resource is not enabled for the transmission of the BFR report; and
   disabling the UE from transmitting the BFR report on the second UL resource after determining that the second UL resource is not enabled for the transmission of the BFR report.

5. The method of claim 1, further comprising:
   receiving an UL grant in Downlink Control Information (DCI) that indicates a second UL resource;
   determining that the second UL resource is not enabled for the transmission of the BFR report; and
   disabling the UE from transmitting the BFR report on the second UL resource after determining that the second UL resource is not enabled for the transmission of the BFR report.

6. The method of claim 1, wherein the BFR report comprises a bitmap that contains a first bit and at least one second bit, the first bit indicates whether the beam failure event is detected on the SpCell, and each of the at least one second bit indicates whether the beam failure event is detected on a corresponding Secondary Cell (SCell).

7. The method of claim 6, further comprising:
   setting the first bit and one of the at least one second bit to a same value when the beam failure event is detected on the SpCell and an SCell corresponding to the one of the at least one second bit.

8. The method of claim 1, further comprising:
   determining that the first UL resource is not enabled for the transmission of the BFR report in a case that the first UL resource is not indicated by the RAR message or the RRC message is not configured with the indication.

9. The method of claim 8, further comprising:
   disabling the UE from transmitting the BFR report on the first UL resource after determining that the first UL resource is not enabled for the transmission of the BFR report.

10. A User Equipment (UE) comprising:
    a memory; and
    at least one processor coupled to the memory and configured to:
       receive a Radio Resource Control (RRC) message;
       detect a beam failure event on a Special Cell (SpCell); and
       perform operations in response to detecting the beam failure event, the operations comprising:
          transmitting a preamble to the SpCell;
          receiving a Random Access Response (RAR) message from the SpCell;
          determining whether a first Uplink (UL) resource is enabled for transmission of a Beam Failure Recovery (BFR) report according to whether the first UL resource is indicated by the RAR message and whether the RRC message is configured with an indication; and
          transmitting the BFR report on the first UL resource after determining that the first UL resource is enabled for the transmission of the BFR report.

11. The UE of claim 10, wherein the at least one processor is further configured to:
    determine that the first UL resource is enabled for the transmission of the BFR report when the first UL resource is indicated by the RAR message and the RRC message is configured with the indication.

12. The UE of claim 10, wherein the at least one processor is further configured to:
    start a timer after the preamble is transmitted;
    receive an UL grant that indicates a second UL resource when the timer is not running;
    determine that the second UL resource is not enabled for the transmission of the BFR report; and
    disable the UE from transmitting the BFR report on the second UL resource after determining that the second UL resource is not enabled for the transmission of the BFR report.

13. The UE of claim 10, wherein the at least one processor is further configured to:

receive an UL grant that indicates a second UL resource scheduled on a Secondary Cell (SCell);

determine that the second UL resource is not enabled for the transmission of the BFR report; and disable the UE from transmitting the BFR report on the second UL resource after determining that the second UL resource is not enabled for the transmission of the BFR report.

14. The UE of claim 10, wherein the at least one processor is further configured to:

receive an UL grant in Downlink Control Information (DCI) that indicates a second UL resource;

determine that the second UL resource is not enabled for the transmission of the BFR report; and disable the UE from transmitting the BFR report on the second UL resource after determining that the second UL resource is not enabled for the transmission of the BFR report.

15. The UE of claim 10, wherein the BFR report comprises a bitmap that contains a first bit and at least one second bit, the first bit indicates whether the beam failure event is detected on the SpCell, and each of the at least one second bit indicates whether the beam failure event is detected on a corresponding Secondary Cell (SCell).

16. The UE of claim 15, wherein the at least one processor is further configured to:

set the first bit and one of the at least one second bit to a same value when the beam failure event is detected on the SpCell and an SCell corresponding to the one of the at least one second bit.

17. The method of claim 1, wherein the indication is contained in a beam failure recovery configuration Information Element (IE) in the RRC message in a case that the RRC message is configured with the indication.

18. The UE of claim 10, wherein the indication is contained in a beam failure recovery configuration Information Element (IE) in the RRC message in a case that the RRC message is configured with the indication.

19. The UE of claim 10, wherein the at least one processor is further configured to:

determine that the first UL resource is not enabled for the transmission of the BFR report in a case that the first UL resource is not indicated by the RAR message or the RRC message is not configured with the indication.

20. The UE of claim 19, wherein the at least one processor is further configured to:

disable the UE from transmitting the BFR report on the first UL resource after determining that the first UL resource is not enabled for the transmission of the BFR report.

* * * * *